(12) United States Patent
Solomon

(10) Patent No.: US 7,526,460 B2
(45) Date of Patent: Apr. 28, 2009

(54) MOBILE HYBRID SOFTWARE ROUTER

(76) Inventor: Neal Solomon, P.O. Box 21297, Oakland, CA (US) 94620

( * ) Notice: Subject to any disclaimer, the term of this patent is extended or adjusted under 35 U.S.C. 154(b) by 551 days.

(21) Appl. No.: 11/227,907

(22) Filed: Sep. 14, 2005

(65) Prior Publication Data
US 2006/0085558 A1   Apr. 20, 2006

Related U.S. Application Data

(60) Provisional application No. 60/611,109, filed on Sep. 16, 2004.

(51) Int. Cl.
*G06F 15/18* (2006.01)
(52) U.S. Cl. ............................. 706/14; 706/12; 706/15
(58) Field of Classification Search .................. None
See application file for complete search history.

(56) References Cited

U.S. PATENT DOCUMENTS 6,636,498 B1 * 10/2003 Leung ..................... 370/338
7,277,876 B2 * 10/2007 Solomon ..................... 706/62

OTHER PUBLICATIONS

Kishan Mehrotra et al., Elements of Artificial Networks, 1997, MIT.*
Shang-Fen Guo et al., Grid Mobile Service: Using Mobile Software Agents in Grid Mobile Service, 2004, IEEE, 178-182.*
Ying Li et al., IMSA: Integrated Multi-Computing-Sources Software Architecture, 2004, IEEE, 456-459.*

* cited by examiner

*Primary Examiner*—Joseph P Hirl

(57) ABSTRACT

A hybrid router for dynamical control systems is described. The mobile hybrid software router (MHSR) combines distinctive computational and mathematical techniques, including evolutionary computation (EC), probabilistic simulations (PS), machine learning and artificial neural networks (A-NNs), in order to solve unique problems encountered in an unknown environment in real time. Embodied in intelligent mobile software agents (IMSAs), the MHSR operates within a multi-agent system (MAS) to continually optimize system operation. The MHSR is applied to several major complex system categories. In one embodiment of the system, the MHSR is implemented in hardware, including continuously programmable field programmable gate arrays (CP-FPGAs), for perpetually reconfigurable evolvable hardware operation. Whether in application-specific or multi-functional mode, the MHSR is useful to groups of agents in intelligent systems for adaptation to uncertain environments in order to perform self-organization capabilities.

12 Claims, 30 Drawing Sheets

| Layer | Category |
|---|---|
| 1 | Hybrid Technique Typology |
| 2 | Typology of Combinations of Hybrid Techniques for Specific Applications |
| 3 | Router Implementation of Hybrid Technique Combinations |
| 4 | Intelligent Mobile Software Agent (IMSA) Implementations of Router |
| 5 | Group Behaviors of Multiple Routers |
| 6 | Auto-programming of Network of IMSAs/Routers |
| 7 | Field Programmable Gate Array (FPGA) |
| 8 | System of Multiple FPGAs |
| 9 | Collective Behavior of Self-organizing networks |

| Layer | Category |
|---|---|
| 1 | Hybrid Technique Typology |
| 2 | Typology of Combinations of Hybrid Techniques for Specific Applications |
| 3 | Router Implementation of Hybrid Technique Combinations |
| 4 | Intelligent Mobile Software Agent (IMSA) Implementations of Router |
| 5 | Group Behaviors of Multiple Routers |
| 6 | Auto-programming of Network of IMSAs/Routers |
| 7 | Field Programmable Gate Array (FPGA) |
| 8 | System of Multiple FPGAs |
| 9 | Collective Behavior of Self-organizing networks |

FIG. 1

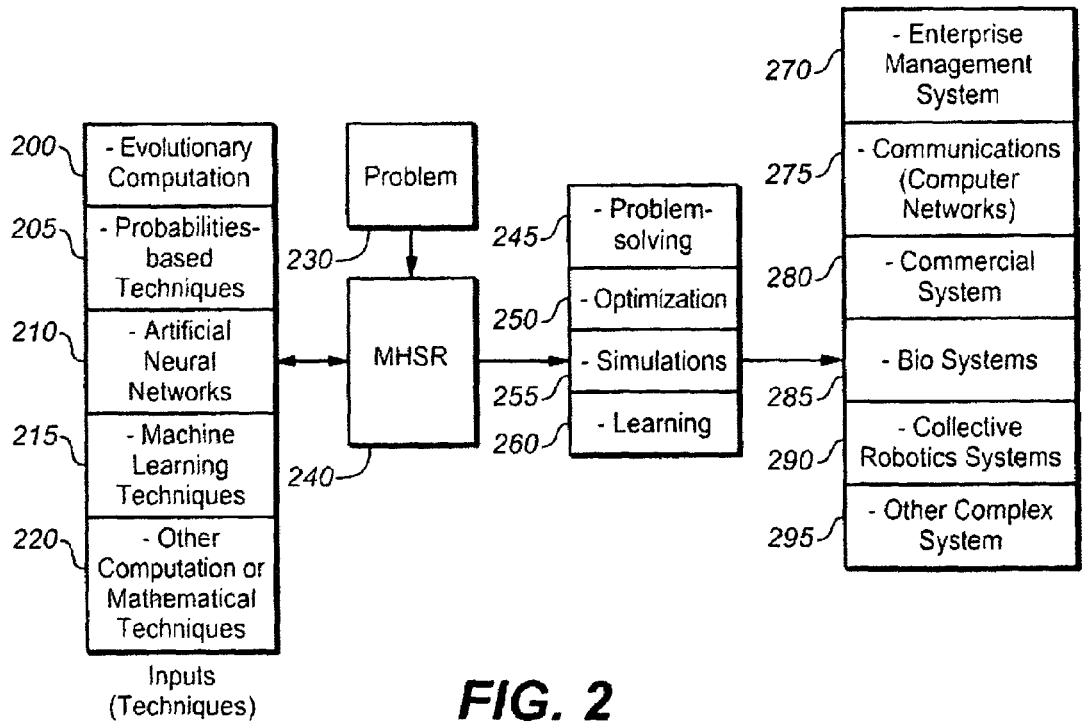

FIG. 2

| Function | Hybrid Synthesis |
|---|---|
| Operation | |
| Mutation | Monte Carlo (MC) |
| Crossover | Matching Random (MC) within Constraints |
| Reproduction | Directed/Constrained Combinations (Not Completely Random) |
| Goal | |
| Solve Problem | Breed Generations to Get to Solution to Functional Task |
| Testing | |
| Testing Fitness of Each Generation | Compare to Optimal Solution to Problem |
| Testing Success of Various Combinations | Combinatorial Optimization |
| Generational Development | |
| Breed Multiple Generations | Focus Direction of Growth with Bayes |
| Finite Numbers of Generations | Time-constraints (Fuzzy Logic) |
| Optimal Focus of Successive Generations | Use Filters: Partially Directed |
| Phases of Success of Each Generation | Passing to Next Phase Contingent on Most Recent Phase Success |

FIG. 7

| Function/Task | Hybrid Combination |
|---|---|
| Compute A-NN Weights | EC |
| Identify Hidden Multi-perception Layers | EC |
| Identify Changes in Environment | EC |
| Social Learning Process | EC |
| Multiple Hybrid A-NN Models | Bayes, MC, EC |
| Optimizing A-NN | EC |

Typology of Hybrid Techniques: Probabalistic Simulations

| Type | Link |
|---|---|
| Bayes Theory (Analysis and Learning) | - Monte Carlo (MC) Techniques to Compute Bayesian Integrator<br>- Classification Theory<br>- Regression Theory<br>- Multi-regression Theory<br>- Evolutionary Computation |
| Monte Carlo (MC) Theory | (Used by Numerous Techniques) |
| Fuzzy Logic (FL) | - Genetic Algorithms Applied to Optimize Estimators<br>- Hebbian Learning Applied to Estimators |
| Markov Decision Processes | - Hebbian Learning for Estimation |
| Gaussian Processes | - Regression (and MRA) Analysis |
| Stochastic Integrated Hill Climbing | - FL Applied to Estimate Solution |
| Regression and Multi-regression Analysis | - Classification (and MCA) Analysis<br>- Bootstrap |
| Factor Analysis | Regression (and MRA) Analysis |
| Cluster Analysis | Factor Analysis |
| Classification Analysis | Factor Analysis |
| Simulated Annealing | GA, GP, EP |
| Bootstrap Methods | Monte Carlo Analysis |
| Support Vector Machines (and Kernel-based Machine Learning) | - Monte Carlo to Generate Random Initial Parameters<br>- Fuzzy Logic to Estimate Solutions<br>- Evolutionary Computation to Optimize Solutions |

*FIG. 24*

Typology of Hybrid Techniques: Evolutionary Computing

| Type | Link |
|---|---|
| Genetic Algorithm (Breeding Generations of Computer Algorithms to Achieve Winning Solution) | - Monte Carlo Simulated Annealing and Gaussian Processes Applied to Random Mutations, Crossover and Reproduction<br>- Bayes and FL to Optimize Feedback and Assess Fitness<br>- A-NN to Guide Directions of Mutations, Crossover and Reproduction |
| Genetic Programming (Breeding Generations of Computer Programs to Achieve Winning Solution) | - Genetic Algorithms to Evolve Programs<br>- Monte Carlo and Simulated Annealing Applied to Random Mutations, Crossover and Reproduction<br>- Bayes and FL to Optimize Feedback and Assess Fitness<br>- A-NN to Guide Direction of Mutations, Crossover and Reproduction |
| Evolutionary Programming (Does Not Use Crossover as a Genetic Operator) | Genetic Algorithms to Evolve Programs<br>- Monte Carlo and Simulated Annealing Applied to Random Mutations and Reproduction<br>- A-NN to Guide Direction of Mutations and Reproduction<br>- Bayes and FL to Optimize Feedback and Assess Fitness |

*FIG. 25*

Typology of Hybrid Techniques: Networks

| Type | Link |
|---|---|
| Artificial Neural Network (A-NN) | - Back Propagation Algorithm to Supervise A-NN<br>- GA, GP and EP to Supervise and Optimize A-NN<br>- Hebbian Learning for Error Minimization, weight Selection and Weight Altering<br>- Markov Decision Processes for Planning Under Uncertainty<br>- Bayesian Theory for Multi-phasal Data Analysis<br>- MC for Random Generation of Weights |
| Feedforward NN | - FL |
| Recurrent NN →<br>Hopfield Networks | - Bayesian Theory<br>- Classification Analysis |
| Stochastic NN<br>Boltzmann Machines | - MC |
| Bayesian NN → | - Bayes<br>- MC |
| Evolutionary A-NN | - MC to Randomly Vary the Topology and the Rules Governing System<br>- GA to Optimize for _Adaptive_ Environment and Rules |
| Spiking (and Asynchronous Spiking) A-NN | - Bayes<br>- MC |
| Pulsed A-NN | - Bayes |
| Hebbian Learning | - Local Linear Maps to Describe the Input/Output Relationship of Data by Region |
| Self-organizing (and Kohonen Self-organizing) Network | - Cluster Analysis<br>- Bayes<br>- MC<br>- Radial Basis Function Network |

FIG. 26

|  | 1. Bayes | 2. Monte Carlo (MC) | 3. EC | 4. A-NN | 5. FL | 8. SVM | Other Techniques |
|---|---|---|---|---|---|---|---|
| 1. Bayes | X | | | | | | |
| 2. Monte Carlo (MC) | | X | | | | | |
| 3. EC | | | X | | | | |
| 4. A-NN | | | | X | | | |
| 5. FL | | | | | X | | |
| 6. Support Vector Machines (SVM) | | | | | | X | |
| Other Techniques | | | | | | | |

Typology of Applications Matched to Hybrid Technique

| Learning | Optimization | Simulations |
|---|---|---|
| Machine Learning<br>- SVM<br>- EC | Traveling Salesman<br>(Each Path is a Solution)<br>- Simulated Annealing<br>- GA, GP and EP<br>- FL | Particle Sims for Dynamic Economy<br>- MC, Bayes and CA |
| Medical Decision-making<br>- Bayes<br>- Markov Decision Processes | Design Feedback Controllers<br>- FL<br>- E-ANN | Thermal Motion of Particles<br>- MC and CA<br><br>Thermodynamics Sims<br>- MC, Bayes and CA (30) |
| Robot Navigation<br>- FL<br>- Marked Decision Processes<br>- E-ANN in Adaptive Environment | Design Networks<br>- GA, GP AND EP<br>- Bayes, FL and CA | Spontaneous Radiation Decay<br>- MC |
| Network Management<br>- Bayes | Circuit Design<br>- MC, Simulated Annealing | Sims for Genetics Analysis<br>- MC, Bayes, GA, GP, EP and A-NN |
| Industrial Process Control<br>- Bayes<br>- E-ANN | CP - FPGA<br>- GA, GP and EP<br>- MC and A-NN | Modeling and Diagnosing Cardiovascular System<br>- GA, GP, EP and A-NN |
| Econometrics<br>(Inflation, Sales, Production and Target Marketing Forecasting; Risk Management and; Credit Evaluation)<br>- MC, Bayes, Regression<br>- Hill Climbing, Bootstrap<br>- Markov Chains | Architecture Design<br>- A-NN and E-A-NN<br><br>Data Mining<br>- Cluster Analysis, SVM, Gaussian Processes and Baysian Data Analysis<br><br>Search Ranking<br>- GA, SVM and Factor Analysis | Modeling Immune System<br>- GA, GP, EP, Bayes and E-A-NN<br><br>Functional Protemics Modeling<br>- GA, GP, EP, Bayes, A-NN |

FIG. 29A

| Learning | Optimization | Simulations |
|---|---|---|
| Competitive Learning<br>- EC<br>- Bayes<br>- Hebbian | Create Taxonomies<br>- Cluster Analysis, Classification Analysis Gaussian Processes, SVM and Hopfield Networks<br><br>Bioinformatics:<br>Predicting Secondary Structure of Proteins<br>- SVM, Bayes, and Gaussian Processes<br><br>Epidemiology Prediction<br>- Bayes, Multi-regression Analysis and Gaussian Processes<br><br>Weather Forecasting<br>- MC, Bayes, SVM, Markov Decision Processes, Cluster Analysis, Multi-regression Analysis, Self-organizing Network | Dynamic Multi-agent System (MAS)<br>- MC, Bayes, CA, E-ANN<br><br>CA Sims (20,30)<br>- MC, Bayes<br><br>CA Sims (40)<br>- MC, Bayes, E-ANN<br><br>Collective Robotics Simulations (Particle Simulations)<br>- MC, Bayes, A-NN<br><br>Scenario Simulations<br>- MC, Bayes, GA, GP, EP, Markov Decision Processes |

FIG. 29B

Typology of Task Categories Matched to Hybrid Techniques

| Problem-solving | Learning | Optimization |
|---|---|---|
| Prediction<br>- Regression (IMBA) Analysis<br>- Gaussian Processes | Pattern Recognition<br>- A-NN, Spiking A-NN, Asychronous Spiking A-NN | Combinatorial Optimization<br>- GA, GP, EP, Simulated Annealing |
| Data Classification<br>- A-NN, SVM, Gaussian Processes, Cluster Theory, Classification Theory, Hopfield Networks, Self-organizing Map | Maintenance Planning<br>- Markov Chains | (Best) Predictor of Success<br>- Gaussian Decision Processes<br><br>(Best) Predictor of Value and Determination<br>- Regression (and MRA) Analysis |
| Ranking Problems (Search Engine)<br>- GA, GP, EP and SVM | Planning Under Uncertainty<br>- FL<br>- Markov Decision Processes | Search Space (Set of Possible Solutions)<br>- GA |
| Time-series Problems<br>- Bootstrap and SVM | | Fault Tolerance<br>- A-NN |
| Spatial Structure Problems<br>- Bootstrap, SVM, Factor Analysis | | Error Minimization<br>- Hebbian Learning |
| Taxonomics<br>- Cluster Analysis and Self-organizing Map | | Feature Mapping<br>- Hebbian Learning |
| Most Likelihood<br>- Boltzman Machines | | Density Estimation<br>- Hebbian Learning |
| Variable Reduction<br>- Factor Analysis, Variable (and Multi-variable) Analysis | | |

*FIG. 30*

Typology of Main Processes Matched to Techniques - A

Problem-solving

- GA, GP, EP
- SVM
- A-NN
- Gaussian Processes
- Regression Analysis
- Bootstrap
- Factor Analysis
- Cluster Theory
- Classification Theory

Learning

- GA, GP, EP
- Bayes
- Machine Learning (Kernel-based, SVM)
- ANN and E-ANN
- Hebbian (Competitive Learning)
- Markov Decision Processes (Reinforcement)
- Self-organizing Network (Kohonen)

Optimization

- GA, GP, EP
- FL
- SVM
- Simulated Annealing

Simulations

- MC
- Bayes
- CA
- GA, GP, EP
- A-NN

Feedback

- FL
- Bayes
- E-ANN

Self-organizing Processes

- Hebbian Processes
- A-NN
- Cluster Analysis

FIG. 31

Typology of Main Processes Matched to Techniques - B

| Data Analysis | Forecasting |
|---|---|
| - Cluster Analysis<br>- Bayes<br>- SVM<br>- Gaussian Processes | - SVM<br>- A-NN<br>- Cluster Analysis<br>- Markov Decision Processes |
| Data Classification | Anticipation |
| - Hopfield Networks<br>- SVM<br>- Bootstrap<br>- Factor Analysis<br>- Gaussian Processes<br>- ANN<br>- Cluster Analysis<br>- Classification Analysis<br>- Self-organizing Map | - Bayes<br>- Gaussian Processes<br>- Markov Chains |
| | Planning |
| | - Bayes<br>- Markov Decision Processes |
| Pattern Recognition | Decision-making<br>- FL<br>- Markov Decision Processes |
| - SVM<br>- Spiking A-NN<br>- Asyneronous Spiking A-NN | Approximation/Estimation |
| | - MC<br>- Hill Climbing |
| Prediction<br>- Regression (and MRA) Analysis<br>- Gaussian Processes<br>- Classification Analysis | Time Constraints |
| | - FL<br>- Bootstrap |

FIG. 32

Meta Typology

| General Typology | Combinations of Hybrid Techniques |
|---|---|
| Custom Solutions | Narrow Hybrid Combinations of Techniques |
| Time-sensitive Solutions | Complex Hybrid Combinations of Techniques |
| Reverse-engineer Solutions from Problems | Sequences of Combinations of Hybrid Techniques for Complex Problems |
| Seek Supplemental Modules: "Going Home" for Tune-up | |

FIG. 33

Dynamic Enterprise Management System

| Category | Task | Hybrid Techniques |
|---|---|---|
| Learning | Econometrics:<br>Forecasting and Predicting | E-ANN, MC, Multi-regression Analysis, Hill Climbing, Bayes, Bootstrap, Markov Decision Processes, SVM |
|  | Sales Forecasting | " |
|  | Production:<br>- Planning<br>- Customization | " |
|  | Industrial Process Control | " |
|  | Risk Management | " |
|  | Credit Evaluation | " |
|  | Target Marketing | " |
| Problem-solving | Data Mining and Analysis | SVM, Cluster Analysis, Bayes, Gaussian Processes, Self-organizing Map, Hopfield Networks, Classification Theory, CA, MC" |
|  | Coordinating Factory Systems |  |
| Optimization | Organizational Design | GA, GP, EP, Simulated Annealing, FL, Bayes, E-A-NN |
|  | Industrial Process Control |  |
|  | Traveling Salesman:<br>Most Efficient Path, with Time Constraints, in Dynamic Environments | " |
|  | Matching Organizational Architecture to Changing Market |  |
| Simulations | Economic Modeling | MC, Bayes, GA, GP, EP, CA, A-NN |

*FIG. 41*

Computer and Communications Network Operation

| Category | Task | Hybrid Techniques |
|---|---|---|
| Learning | Pattern Recognition | SVM, Bayes, Markov Decision Processes, FL, Spiking A-NN, Hill Climbing, GA, GP, EP |
| | Planning Under Uncertainty | |
| | Discovery of Outcomes | " |
| | Decision-making Under Uncertainty | " |
| | Adaptive Distributed Networks | " |
| | Network Management | " |
| Problem-solving | Data Mining and Analysis | Hopfield Networks, A-NN, Classification Theory, Cluster Theory, SVM, Gaussian Processes, Self-organizing Map |
| | Data Classification | |
| Optimization | Search Ranking | GA, GP, EP, Simulated Annealing, Hebbian Learning, SVM, A-NN |
| | Taxonomics | |
| | Aggregation | " |
| | Traffic Management | " |
| | Synchronicity of Network with Anticipation | " |
| Simulations | Traffic Flow | MC, Bayes, GA, GP, EP, E-A-NN, CA, A-NN |
| | Traffic Plasticity | " |
| | Scenario Sims | " |

*FIG. 42*

Commercial System Operation

| Category | Task | Hybrid Techniques |
|---|---|---|
| Learning | Econometrics: Forecasting and Prediction | MC, Bayes, Bootstrap, Hill Climbing, E-A-NN, Multi-regression Analysis, Markov Decision Processes |
| | Inflation | " |
| | Interest Rate | " |
| | Money Supply | " |
| | Employment | " |
| | Sales | |
| Problem-solving | Data Mining and Analysis | SVM, Bayes, Cluster Analysis, FL, Gaussian Processes, Multi-regression Analysis |
| | Data Classification | " |
| Optimization | Aggregation Processes | GA, GP, EP, Simulated Annealing, Hebbian Learning, SVM, A-NN |
| Simulations | Dynamic Economics Modeling | MC, Bayes, CA, GA, GP, EP, A-NN, E-A-NN |
| | Industry Dynamics Modeling | " |
| | Supply Chain Management | " |
| | Network Trading Hubs Clusters and Plasticity | " |

*FIG. 43*

Bio-systems Operation

| Category | Task | Hybrid Techniques |
|---|---|---|
| Learning | Pattern Recognition | MC, Bayes, Markov Decision Processes |
| | Discovery of Outcomes | " |
| | Medical Decision Making | " |
| Problem-solving | Data Mining and Analysis | SVM, Bayes, Cluster Analysis, FL, Gaussian Processes |
| | Data Classification | " |
| | Genetic Pathology | " |
| | Personalized Medicine Development | " |
| Optimization | Epidemiology Prediction | GA, GP, EP, Simulated Annealing, Hebbian Learning, SVM, Cluster Analysis, A-NN |
| | Recombinant DNA | " |
| | Predicting Secondary Structure of Proteins in Finite Search Space | " |
| Simulations | Modeling and Diagnosing Cardiovascular System | MC, Bayes, CA, GA, GP, EP, A-NN, E-A-NN |
| | Modeling Immune System with Pathogenic Interaction | " |
| | Modeling Genetics | " |
| | Modeling Functional Proteomics | " |

FIG. 44

Collective Robotics System Operation

| Category | Task | Hybrid Techniques |
|---|---|---|
| Learning | Pattern Recognition | MC, Bayes, Markov Decision Processes |
| | Planning Under Uncertainty | " |
| | Decision Making | " |
| | Robot Navigation | " |
| Problem-solving | Data Mining and Analysis | SVM, Bayes, FL, Cluster Analysis, Gaussian Processes, Factor Analysis, Bootstrap |
| | Data Classification | |
| | Collective Robotics Coordination | " |
| | Time Series Problems | " |
| | Spatial Structure Problems | " |
| Optimization | Taxonomy Creation | GA, GP, EP, Simulated Annealing, Hebbian Learning, SVM, A-NN, Cluster Analysis, |
| | Search Ranking | |
| | CR Aggregation | " |
| | | " |
| | Traveling Salesman: Most Efficient Task | |
| Simulations | CA - (2D, 3D, 4D) | MC, Bayes, CA, GA, GP, EP, A-NN, E-A-NN |
| | | " |
| | Scenario Sims | " |
| | CR Sims | " |
| | CR Sims in Adaptive Environments | |

*FIG. 45*

MOBILE HYBRID SOFTWARE ROUTER

CROSS-REFERENCES TO RELATED APPLICATIONS

The present application claims the benefit of priority under 35 U.S.C. § 119 from U.S. Provisional Patent Application Ser. No. 60/611,109, the disclosure of which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

1. Field of the Invention

The present invention is concerned with control theory, dynamical control systems, controllers, hybrid control systems, routers, computer and communication routing architectures, multi-agent systems, complex computer operating systems, intelligent systems and distributed computer systems. In addition, the present invention deals with artificial intelligence techniques, including evolutionary computation and machine learning, probabilistic simulations, and artificial neural networks, as well as with the combinatorial optimization of hybrid mathematical and computational techniques. The present invention is applicable to computational, engineering, mechanical and aeronautical systems, including complex distributed systems.

2. Description of Prior Art

Complex computer systems increasingly require the integration of combinations of problem-solving techniques for the real time adaptation to environmental change. In the case of groups of cooperating software agents in a multi-agent system, artificial intelligence (AI) is required to solve problems posed by a changing environment. On the other hand, systems comprised of computer hardware networks can also adapt to environmental changes by using AI processes. In both cases, adaptation is achieved by implementing highly complex software which enables mobile hybrid AI processes.

While the field of AI has developed over decades to create specific techniques, a useful hybrid software implementation of AI systems has not been forthcoming. Specifically, a software system is needed which can combine various AI processes in real time to solve complex problems which require adaptation to changing and uncertain environments. Such a system would identify and solve complex problems on the fly. The main vehicle for such a software implementation would be a mobile hybrid software router, which identifies the problems, combines the AI processes and provides solutions in context.

A mobile hybrid software router (MHSR) is implemented in intelligent mobile software agents (IMSAs). IMSAs operate in a multi-agent system (MAS) which is either cooperative, competitive or hybrid. In a cooperative MAS, IMSAs work together to complete a task, while in a competitive MAS, IMSAs negotiate in a game-theoretic competition until a winning strategy is determined, and in a hybrid MAS, a combination of processes occur, including competing coalitions, for varied outcomes. In dynamic environments the MHSR is a critical component to IMSA operation.

MHSRs, implemented in IMSAs, can also be implemented in hardware so as to enable specific computer, electrical and mechanical functions. In one embodiment, MHSRs activate perpetually reprogrammable evolvable hardware (EHW). The application of MHSRs to field programmable gate array (FPGA) integrated circuits will accelerate the reconfigurability process as well as the process of hardware usability for adaptive problem solving processes in dynamic environments. Examples of applications of MHSRs to EHW include collective robotics systems and advanced adaptive computer networks. The application of MHSRs is useful in the self-organization of collectives of hardware and software entities in highly complex systems. In addition, with the use of this system, emergent (commercial) behaviors can be anticipated and optimized to create dynamic hubs for maximum network efficiency.

The present invention provides methods and apparatus for a system with implementation in computer software and hardware. The system provides a toolkit for the implementation of hybrid computational or mathematical techniques in which an IMSA is evolvable and auto-programming in order to solve problems in real time in dynamic environments. In order to perform these functions, an IMSA, or groups of IMSAs, identify problems in the environment, develop various possible solutions using unique combinations of various hybrid techniques, select an optimal solution and perform a specific function or combination of functions in order to accomplish a task or tasks. Since the environment is dynamic, changing and unpredictable, the system must learn to anticipate and adapt in real time. This anticipatory behavior is illustrative of emergent and self-organizational systems.

Implementation of the MHSR will facilitate the emergence and interaction of "thinking" machines. Because it is mobile (as implemented in IMSAs), the MHSR is fundamental to the development of a complex operating system with applications to systems involving collective behaviors.

While there is significant theoretical research in computer science, mathematics, psychology, logic and philosophy involving artificial intelligence, complex systems for self-organization, adaptive computer programs and evolvable hardware, there is a dearth of intellectual property on adaptive software with applications to multi-agent systems or evolvable hardware.

Two computer science fields in which there is some work on AI are collective robotics and dynamic computer networks, though these fields are nascent. Neither of these fields has developed a MHSR for use in adaptive and reconfigurable systems, though such a model would be highly useful.

In the field of artificial intelligence, John Holland has developed some of the original ideas involving genetic algorithms. His student, John Koza, has developed the original ideas involving genetic programming. These computer programming techniques borrow ideas from genetics and the theory of biological evolution in order to construct evolutionary computation (EC) processes. By using analogies of biological processes, these theorists seek to provide methods by which computers adapt to their environment and thus construct self-organizing systems. Both of these theorists, as well as theorists from the Santa Fe Institute, have been involved in developing complexity theory, which develops approaches of self-organizing, emergent and adaptive artificial systems that emulate biological systems. None of these theorists have alluded to the development of a MHSR to be implemented in software and applied to computer networks, collective behaviors and complex systems.

In other research streams, the development of complex probabilistic techniques and methods, particularly involving Bayesian theory and Monte Carlo theory, have been useful in providing approaches to learning and simulations. In addition, the emergence of support vector machines (SVM) and other kernel-based machine learning processes apply to learning and optimization problems. Moreover, the research stream involving artificial neural networks (A-NN) has developed approaches that are useful in application to learning processes that are adaptive to dynamic environments. However, no one has combined the EC, SVM, A-NN and probabilistic approaches for use in a single adaptable hybrid model for implementation in mobile software for application to problem solving in complex systems.

Finally, literature involving evolvable hardware (EHW) focuses on field programmable gate arrays (FPGAs) for the development of reconfigurable prototype hardware. While there is a literature involving EHW which focuses on hardware aspects, there is very little literature involving the complex software processes that analyze and configure the hardware implementation.

Consequently, the present invention provides a novel model for the development of a MHSR with various applications.

There are various challenges to the development of a MHSR. First, how does the model select the correct EC, machine learning, probabilistic and A-NN techniques for each circumstance? Second, how does the model synthesize various computational or mathematical techniques to solve various problems? Third, how does the model solve problems in real time that require different solutions? Next, how does the model develop customized, that is, hybrid solutions comprised of combinations of techniques to varied problems? Moreover, how does the model use the appropriate computational solution in a distributed and mobile environment?

How does the system use complex sequences of hybrid techniques for application to complex systems? How does the system coordinate multiple application-specific MHSRs to solve problems? How does the system coordinate multiple multi-functional MHSRs to solve problems? How does the MHSR access multiple distributed databases to select or discard program code in an optimal model? How can the system be implemented in hardware, as well as software, for use in solving complex engineering problems. Finally, how can we develop a problem-driven automated programming model for adaptation to dynamic environments? The present invention sets out to answer these questions by providing novel solutions.

BRIEF SUMMARY OF THE INVENTION

The present invention integrates several aspects of AI applications into mobile software agents. In order for AI to be effective at interacting with the environment, software agents must search for information, identify anomalies, provide assessment and analyses, make evaluations and decisions, solve problems and take action in real time. Each of these components of search, problem-identification, analysis, decision-making, problem solving, learning and adaptation are required by intelligent mobile software agents (IMSAs). A MHSR, which is a central component of the IMSAs, requires these elements.

In order for a MHSR to function, it needs an initial map. An initial map is self-organized on the basis of initial programming and available system information. The MHSR uses data search approaches to narrow the scope of information collection. The initial map is continuously updated with new information and constantly reorganized. In this way, as the environment changes, the MHSR collects and processes new information. As the environment changes, sensor data from various sources can inform the MHSR in real time. The MHSR performs these data collection and data organization functions by generating queries and sorting data into a self-organizing map. Search techniques are also useful to locate the appropriate computational or mathematical techniques for each problem that the router encounters. In this way, as problems emerge, the MHSR will have tools to search for and find solutions, and to adapt to changing environmental conditions in real time. Applications of search techniques can solve the complex problem of processing feedback to the environment.

When an anomaly is detected in a pattern or trend, the problem is "bounded" or limited. Counter-factual contingencies are offered to narrow the scope of the problem. Once distinctions are made restricting the scope of the problem, a working theory is developed to solve the problem. The MHSR performs quantitative analyses to sort, test and organize variables. Upper and lower limits of search parameters are established to identify the optimal range for solutions.

Filters are employed by the MHSR to prune possible solutions to problems. By using pruning techniques in filters, the MHSR can distinguish what we know from what information is missing from the analysis. In some cases, incomplete information will require a delay of a decision to allow the collection of more data or to analyze data. By limiting information, and then adding information selectively, multivariate analyses allow the AI router to evaluate problems and select optimal solutions. Filters are useful in identifying what is missing from the solution and in selectively ordering information.

The use of probabilistic methods is important to the effective operation of the AI router. Probabilities are applied by employing Bayesian and Monte Carlo approaches, induction and fuzzy logic models. Bayes theorem uses known experience to make decisions about unknown situations by applying statistical modeling. Bayesian modeling is useful for learning, strategic planning and scenario development and selection. Specifically, the MHSR uses Bayesian reasoning to interact with and adapt to an uncertain environment. One of the most valuable statistical models is the Monte Carlo approach which assesses the limits of random information in an uncertain environment. The benefit of adopting statistical and probabilistic methodologies in the MHSR is the ability to anticipate uncertain events within logical constraints. Anticipations of events are structured as scenarios.

Scenarios are evaluated by the MHSR. By testing the best options for a solution to a problem, the MHSR selects the best available choice in order to make a decision to execute a strategy. Scenarios are developed based on extrapolation of the available information; scenarios are evaluated using statistical methods for projecting and analyzing trends. As more complete information is made available, the scenarios are clarified and predictions made about events in the environment.

Scenarios are organized by the MHSR in the form of simulations. Simulations are used by the MHSR as a form of real time experiment in the planning process that is preparatory to the formulation and execution of a formal strategy of action. Simulations often take the form of continuous spatial and temporal relationships that are organized by statistical methods.

The MHSR uses scientific reasoning. It combines methods to construct unique hybrid logical solutions for particular problems and to interact with, and adapt to, its environment in real time. Since it combines various unique logical approaches, it must achieve an optimal combination for each situation from among the best available choices. Thus, a unique hybrid model is used in each situation by the MHSR. In effect, the MHSR continuously optimizes the application of AI processes for specific problems that arise from interaction with an uncertain environment.

The MHSR constructs unique and novel combinations of EC, probabilistic, machine learning and A-NN methods. However, specific classes of situation-driven problems to solve create a classification schema of AI methods with typical applications that involves the need to recognize (routine) hybrid combinations of AI techniques for specific classes of problems. By creating unique combinations of techniques to solve similar categories of problems, the MHSR not merely applies combinatorial optimization approaches of combining logical techniques, it also synthesizes novel and hybrid approaches in a form of machine creativity which is useful in finding solutions for problems where learning and adaptation to a changing environment is necessary. An example of the application of hybrid synthetic AI techniques can be seen in the traveling salesman problem (TSP).

The TSP is a classic optimization problem in which a salesman is expected to find the shortest route to each of his sales calls. This efficiency and ordering problem is made more complex in environments with changing criteria, such as variable traffic or changing priorities. But in some versions of this problem, the TSP is made dynamic by a changing environment. For example, as the salesman is in the process of making the sales calls to customers, the environment itself changes, the workload varies and there is a need to adapt the efficiency strategy. In other words, rather than a task of ordering the most efficient way to get to customers, the salesman's problem becomes one of resorting priorities in a limited time frame as external factors influences them. It is clear that under these changing conditions the salesman must employ adaptive algorithms which accommodate change and which embrace new information, learning and constant rerouting.

The MHSR possesses the ability to learn and adapt to environmental feedback in order to solve problems. After identifying problems as anomalies, the router must develop prospective solutions by applying the various hybrid EC, probabilistic, machine learning and A-NN techniques.

The MHSR uses various techniques to learn. One of the most prominent techniques used for learning systems is applications of artificial neural networks (A-NNs). A-NNs operate by adjusting weights of the synapses of neurons in the environmental interaction process, from a random initial state to a fully developed and predictable state, with the most active neurons gaining the most use and the least active atrophying. Various A-NN techniques are used to refine the learning process. A training process allows the A-NN to learn by using statistical methods. Evolutionary computational techniques and statistical modeling techniques merely assist the A-NN in its learning processes. When combining experience with the training process, the A-NN enables forward movement with limited information about the environment at each stage, presenting adaptation as a sort of drafting process.

Artificial intelligence procedures and processes are used in various ways with MHSRs. AI is an umbrella term for a range of evolutionary computation (EC) approaches and techniques based on biological and genetic process analogies, from natural selection and crossover to random mutation and survival of the fittest. The main models of EC are genetic algorithms (GA), genetic programming (GP) and evolutionary programming (EP). For the most part, these main approaches to EC create populations of each generation that reproduce, select the fittest populations of each generation and interact with the environment in order to adapt via feedback and trial and error.

Despite the existence of distinct GA, GP and EP approaches, there are also hybrid EC approaches that combine elements of the main methods in order to solve problems. In this way, unique situations can synthesize the best aspects of various computational and mathematical techniques. Hybrid approaches may include combinations of EC, A-NN, logic (such as fuzzy logic), machine learning and probabilistic methods. For example, A-NN is useful for Bayesian techniques in learning and inductive applications, while EC is useful to some A-NN applications as well as probabilistic modeling.

Distributed AI and Social Intelligence

Distributed AI (DAI) is used in complex multi-agent systems. DAI is typically either cooperative or competitive, with groups of AI endowed agents interacting with each other and with the environment. In this context, hybrid AI techniques are used generally by the MHSR within IMSAs that exhibit collective behaviors.

The combining of hybrid AI techniques in a self-organizing and emergent system exemplified by the operation of the MHSR illustrates new aspects of automated computer programming (ACP). The ability to solve problems by applying unique combinations of hybrid AI techniques represents a novel computer programming paradigm beyond the traditional model of preprogramming machines with static and predictable methods. Precisely because computers operate in complex and unpredictable environments in order to solve shifting problems with novel combinations of techniques, synthesis and creativity in the evolution to ACP systems are a necessary innovation.

In the context of a multi-agent system (MAS), IMSAs endowed with the MHSR operate as independent agents constantly customizing solutions to problems. In effect, the IMSAs construct their own customized hybrid algorithms as automated reconfigurable software on the fly in real time. The IMSAs effectively "think", "create" and "solve" unique problems. Because there are multiple IMSAs inter-operating in an MAS, taken together, the 'MSAs' activities comprise collective behaviors.

IMSAs may be specialized or multifunctional. Specialized IMSAs generally have a specific function, with a limited role within an application. On the other hand, multi-functional IMSAs may have multiple roles and may change roles during the performance of a complex task. Multi-functional IMSAs are thus reconfigurable and more adaptive to their environment. Nonetheless, in the case of specialized IMSAs, groups of specialists can work together in teams, thereby dividing tasks in order to accomplish a goal more quickly. Particularly because IMSAs are mobile, they can work together as specialists, tracking each others' movements and constantly sending messages among themselves about current activities, plans and goals.

Since IMSAs are social, generally either cooperative or competitive, MHSRs provide the "reasoning" capabilities that allow IMSAs to interact and perform their operations. In general, cooperative IMSAs collaborate in order to accomplish a task. Conflicting agents use argumentation and negotiation to agree upon a course of action. In both cases, DAI techniques develop social forms of learning. Novel hybrid AI techniques are used in order to allow groups of IMSAs to participate in successful group behaviors. Application-specific and multi-functional MHSRs perform social functions for group behaviors in IMSAs differently, with the former working in a division of labor and the latter switching roles.

There are also hybrid social IMSAs that illustrate aspects of both cooperative and competitive behaviors. As an example of this witness the competing (and typically shifting) coalitions of groups of IMSAs. In dynamic environments, groups of IMSAs using hybrid DAI techniques reveal the superior success of groups over individual agents. In fact, the collective behavior of groups of IMSAs reveals distinctive dynamics that may oscillate from cooperation to competition. Illustrations of these dynamics can be observed in the modeling of economic behaviors, collective robotics and in the operation of self-organizing networks. The implications of the utility of the MSHR are therefore substantial.

Whether cooperative, competitive or hybrid, most collective IMSA models use the afore-cited social biological analogies to emulate group behavior. These analogies include evolutionary mechanisms, environmental feedback, population dynamics, reproductive processes, learning/teaching, survival of the fittest, mutation and system self-organization. In general, these models of collective behavior seek to achieve continuous optimization in dynamic environments. In effect, these models are continuously seeking, but never fully achieving, equilibrium in their attempts at self-organization.

Interaction occurs not only between the agents and the environment, but among the agents themselves, as they constantly seek agreement in order to perform tasks. There is, consequently, effective interdependence of two complex systems, including one software-based MAS and one hardware based, which co-evolve and integrate in order to carry out the processes of adaptation to an external uncertain environment.

While groups of cooperating IMSAs have similar goals and task parameters, competing IMSAs typically use game theoretic modeling in order to develop approaches to negotiate specific issues. Competing IMSAs offer arguments to settle an issue, with the winner being determined by how optimally its parameters match the particular problem. In one example, coalitions of IMSAs compete to determine an optimal simulation to be used, using the sensor and learning features of groups of IMSAs. Once the winning simulation is determined, the group can select and execute a strategy to solve a problem or perform a function.

While cooperation is a less complex strategy which exhibits less risk, decreased hostility and increased coexistence, competition plays an important role in determining outcome in some circumstances. Both main models of group behavior illustrate forms of social interaction that reveal a social function of automated computer programming available in complex distributed computation applications.

Another characteristic of cooperative and hybrid group behaviors is the use of aggregation to pool groups of similarly interested IMSAs that may perform common functions. Combined groups of common interest agents can perform tasks more quickly and efficiently. Similarly, groups of cooperative agents can more efficiently teach each other by using group learning processes. Within collectives of IMSAs, agents can be trained at different rates, in effect developing a system of just-in-time learning for IMSAs.

By allowing the MHSR to be employed by various IMSAs in group scenarios, the interacting agents are more effective in accomplishing their tasks. Unique configurations of coalitions of IMSAs use game theoretical modeling to work together to resolve conflicts, to cooperate and to adapt to their environment by solving dynamic problems.

MHSR Techniques

A range of distinctive techniques can generally be considered to fall under the umbrella of artificial intelligence. These techniques generally use learning processes to adapt to an uncertain environment and to solve problems. However, these techniques are also considered to be more general than artificial intelligence. Examples of these techniques are:

Simulated Annealing
Stochastic Iterated Hill Climbing
Bayesian Learning
Markov Chains and Markov Decision Processes
Monte Carlo Technique
Regression Analysis
Multivariate Analysis
Genetic Algorithms
Genetic Programming
Evolutionary Programming
Artificial Neural Networks
Evolutionary ANNs
Gaussian Processes
Hopfield Networks
Hebbian Learning Methods
Machine Learning Methods
Inductive Learning Methods
Deductive Learning Methods
Cluster Analysis
Classification Analysis
Category Analysis
Fuzzy Logic
Boltzmann Machines
Support Vector Machines
Cellular Automata Machines
Bootstrap Statistical Methods
Factor Analysis MHSR Technique Hybridization These logical, mathematical and computational techniques are each useful to solve unique problems. In addition, some of these techniques are useful when applied to the other techniques. For instance, GA and GP are useful for A-NNs. GA is applied to Bayesian Learning, and Bayesian Learning is applied to A-NNs. Further, each of these categories of techniques themselves may entail numerous specific techniques that are applicable to various situations.

When some of these techniques are applied to other techniques, they may be called hybrid techniques. For example, GA may be applied to Bayesian Learning, which is applied to an A-NN, which is useful in a self-organizing map. GP may be applied to the initial training process of an A-NN, which may then be applied to an optimization problem. Thus, though they are hybrid techniques, these unique combinations, which are applicable to specific distinctive situations, are aggregations of approaches that represent the best available combinations of techniques. Specifically, highly complex problems may require customized solutions that the various hybrid techniques may furnish. In addition, the benefit of the hybrid combination approach exemplified by the MHSR is that the best specific tool combinations are available at key times in the quest for solutions. With the main categories of logical, mathematical and computational techniques already developed and available for solving different classes of problems, their integration into distinctive combinations brings us a step closer to the ideal of automated computer programming.

Analogies of the Present Invention With Biological Processes

Biologic system operation analogies are useful in describing intelligent systems. The present invention emulates, and transcends, the aspects of several major biologic operations.

Analogously to the way DNA provides an evolving code of organisms, the present invention allows rapidly evolvable computer programming that may involve the acceleration of environmental feedback as a systemic operation. Further, genetic mutations, which are generally random in occurrence, in the present invention may be either completely random (thereby providing novel solutions to intractable problems) or highly directed, thereby providing increasingly efficient evolutionary pathways to more rapidly align with the environment. The present invention can rapidly correct, control or bypass the negative effects of mutations.

The bioengineering notion of recombinant DNA provides an analogy for the combination of various parts of computer programs, the development of which are accelerated in the present invention, to provide solutions to new problems. In addition, the notion of combining various genes in ways that affect a preferred function is mirrored in the essential combination function of the MHSR that processes hybrid computational techniques. Yet the MHSR is able to construct specific novel combinations of genes (computer code sequences) on demand for various tasks and applications, whereas the genetic model is constrained by hereditary endowment for specific environmentally optimal situations.

Unlike existing biological DNA, which contains the residue of "junk" or ineffective genes and which accumulates over generations to pass to offspring, the present invention uses a reduced instruction set computing (RISC) model as a minimalist foundation to process program code; this promotes more efficient mobility in the passing of code from one location in a distributed network to another. Much as it occurs in the DNA model, major code is accessed and activated when needed for specific tasks, but in our model the access to code is not inefficiently over-determined.

In a further analogy between the present system and the cellular proteomics network that acts as a process of intercellular communication, the present invention also provides intra-systemic feedback mechanisms that facilitate co-adaptation processes. Analogously to the process of utilizing enzymes to accelerate proteomic pathways of cellular processes, the present system uses analytical approaches to modulate the synchronization of computational processes by employing methods of acceleration or deceleration.

Similarly, the present invention uses IMSAs to implement the MHSR, akin to how RNA replicates parts of genetic code for activation of specific genes for a specific real-time application. In fact, the concept of the DNA-to-protein model to provide cellular functionality for biological processes parallels the concept of the MHSR as a router that combines hybrid computational techniques in anticipatory and interactive ways and that integrates with IMSAs and FPGAs for operational system functionality.

Analogously to the operation of the human immune system (and antibodies), the present invention's MHSRs, and IMSAs, develop a complex adaptive system that involves the operation and coordination of complex social processes for interaction with the environment so as to reduce pathogenic attacks and promote adaptation to the environment for long-term survival.

Biological competition between groups (for limited resources) is also emulated by complex game-theoretic modeling. In order to co-evolve with its environment, the present system also develops complex learning processes, typically from trial and error; nevertheless, the present invention is far more efficient at interpreting and applying results of experimentation and learning than biological systems. On the macro-social level, an analogy can be drawn between population dynamics and its phenomenon of plasticity (or rapid transformation of utility patterns), and the present invention's MHSRs which facilitate more rapid development of useful pathways, allowing the less useful pathways to fade away, and thereby providing for network restructuration, particularly in highly dynamic environments. Finally, the interconnection of all of these sub-systems into a dynamic intelligent system represents a transcendence beyond the limits of biological systems in complex computer and engineering systems, thereby allowing optimum performance.

In all cases, the present system uses computational, logical, mathematical and engineering processes to exceed the limits of the biology paradigm. The present invention in effect improves on nature.

Applications of the MHSR

There are a range of applications for the MHSR, generally divided into four main categories: (A) problem-solving tasks, (B) simulation modeling, (C) complex systems and (D) evolvable hardware.

The system solves optimization problems, pattern recognition problems and unique problems that require customized solutions. The MHSR also performs simulation modeling in various task categories.

Specific tasks performed by the MHSR include generating incomplete/partial self-organizing maps (SOM), generating focused (not random) training programs, generating efficient mutation models, selecting winner-determination of scenarios based on available information, solving optimization problems, solving combinatorial optimization problems (constructing unique combinations), providing focused (not random) learning or inductive approaches, providing analysis of multi-sensor data streams, providing time-sensitive analysis, allowing acceleration of parallel operations and performing reverse engineering processes.

One of the extraordinary features of the MHSR is the dynamism of its operation in highly temporal-sensitive systems. As computer networks get more complex, there is an increasingly dynamic aspect to their function. The MHSR plays a key role in integrating complex systems in these dynamic environments.

There are a number of complex system applications of the MHSR. These applications include (1) enterprise resource management, (2) adaptive and self-organizing distributed computer and communications networks, (3) commercial trading hubs for supply chain management, (4) biosystems modeling for bioinformatics, structural proteomics, functional proteomics and personalized medicine and (5) collective robotics (CR). Main CR applications include traffic coordination, hazard management, factory control, sensor synchronization and automated weapon systems.

One potential effect of the MHSR is production of an active thinking machine. Building upon the idea of the MHSR, a highly complex operating system for computer networks may reasonably be developed. In a sense, the emergence of interactive processes between a software operating system and a hardware system is possible by implementing the MHSR as well.

MHSR Applications to Evolvable Hardware

In one embodiment of the system, the MHSR is applied to evolvable hardware (EHW). EHW is comprised of reconfigurable integrated circuits in which the gates are modifiable. The most common form of EHW is the field programmable gate array (FPGA). Specifically, the infinitely reprogrammable FPGA allows the rapid reconfiguration of the semiconductor. The usefulness of EHW is that it emulates functional aspects of the non-reconfigurable chip, which performs a specific function, such as an application specific integrated circuit (ASIC), much faster than a traditional semiconductor. Once reconfigured, an FPGA operates similarly to an ASIC with dedicated operation to perform a specific function. A traditional semiconductor, on the other hand, must rely on software to process a set of instructions, in between which operation intermediary logic and memory functions dramatically reduce speed during the performance of a range of functions. The use of continuously programmable FPGAs, in particular, allows the functioning of the EHW model.

The EHW paradigm fits well with the MHSR. Because the MHSR uses processes that are implemented as a software entity, it is complementary with EHW. The MHSR will identify a solution to a problem, generate a software program, reprogram an FPGA and produce an optimally efficient execution of a task. As the environment changes, the software solution changes and the MHSR will constantly reconfigure the hardware for continuously superior performance.

This marriage of the MHSR, embodied in an IMSA, and EHW produces instant customization processes. The FPGA is typically adopted as a prototype that is tweaked by the manufacturer to develop a specification for a distinct use. However, in this application, the FPGA can be continuously reconfigured to operate like a constantly updatable ASIC and thus provide superior performance, particularly in changing environments. In fact, any reconfigurable hardware paradigm may ultimately depend on the software embodied in the MHSR and used by collectives of IMSAs.

The combination of collectives of IMSAs in a multi-agent system (MAS) with groups of disaggregated FPGAs will provide a new paradigm for computing. The model of groups of EHW with multiple electrical and mechanical functionality provides collective behavior in which co-adaptation of the system to the environment is optimized. The external environment provides continuous sensor input information to constantly reordering hubs of EHWs while IMSAs interoperate within the system. The MAS represents a system within the system comprised of the network of FPGAs. The system can more readily adapt to its changing environment with both adaptive software and hardware subsystems. The system becomes self-organizing.

Novelties of the MHSR

A number of novel concepts are constituted in the MHSR. First, the MHSR presents a sequencing and synchronization of distributed methods for various customized applications. Second, the MHSR presents a statistical analysis of unfolding events in a distributed temporal network. Next, the MHSR has both analytical and anticipatory functions that allow it to filter data and analytical tools to create optimal solutions to dynamic problems. Moreover, the MHSR presents a generalized mechanism for unique customized problem solving. The MHSR allows the dynamic interaction of intelligent (mobile) software agents.

The MHSR presents a novel technique for integrating various customized AI methods to solve new problems. The MHSR is thus a meta-tool. By collecting and filtering data from various sensor sources, the MHSR is useful in a distributed MAS environment. Because it operates in dynamic environments, the MHSR provides real time solutions to problems. It is also interactive with the environment.

In an interesting application, the MHSR operates in consort with evolvable hardware. Systems comprised of multiple perpetually reconfigurable hardware entities provide a unique and valuable application of the MHSR, particularly for environmental adaptation.

When combined in systems with multiple MHSRs, a network becomes particularly powerful. The application of the MHSR to IMSAs in complex distributed systems allows increasingly complex problems to be solved. The MHSR is thus interactive with other MHSRs in truly dynamic systems.

In this sense, multiple IMSAs endowed with MHSRs allow the development of unique collective behaviors. Collective robotics, which itself has dozens of applications including industrial manufacturing, hazard management, dynamic multi-sensor control, weapon systems and remote sensing, exemplifies one powerful engineering system category of how the MHSR may be used. Additional complex systems are possible because of the advent of multiple MHSRs. The MHSR makes possible the emulation, and improvement, of the human mind and human collectives.

The present invention has numerous advantages.

Because the present invention combines various computational techniques on-demand to solve problems, it is critical to numerous systemic functions. Whether it combines (a) a major technique with a minor technique, (b) multiple techniques or (c) sequences of combinations of techniques, the MHSR acts as a fundamental functional entity in a complex computer system. The ability to combine various sequences of hybrid computational techniques to solve problems significantly increases the capacity to manage complex systems.

The present invention provides mobility to complex program code in a distributed network, which allows for non-distance-sensitive computations and the solution of complex problems in real time. The ability of the MHSR to interact with distributed databases to optimize efficiency, that is, to carry only the code it needs to solve a problem, represents a major advantage.

MHSRs operate in IMSAs, which have interactive and anticipatory capabilities, beyond the capabilities of passive models. In the present invention, MHSRs integrate with IMSAs to perform specific functions. MHSRs may be application-specific or multi-functional, thus endowing IMSAs with a multitude of capabilities. Application-specific IMSAs work together by using a division of labor, while multi-functional IMSAs may perform various functions by switching roles. In addition, the social behaviors available to groups of coordinated, or competitive, IMSAs, facilitated by MSHRs, are particularly advantageous in effectuating complex applications.

Because MHSRs are implemented in evolvable hardware and thereby allow an acceleration of adaptation processes, they provide a major advantage over prior models. In fact, the present invention employs various approaches that surpass biological models of functional operation (discussed above) and thus develop a truly intelligent system, which is novel and important for complex applications. Not only does the present invention transcend the limits of biological system models, but it surpasses human behavior models as well. This is an advantage in mission critical operations.

Applications of the present invention to enterprise resource management, communication network optimization, supply chain management, bioinformatics systems optimization and collective robotics make it extremely useful as well.

Finally, by facilitating auto-programming capabilities, the present invention makes possible self-organization processes in intelligent systems.

BRIEF DESCRIPTION OF THE DRAWINGS

FIG. 1 is a list of system layers.
FIG. 2 is a schematic diagram of the architecture of a mobile hybrid software router (MHSR).

FIG. 7 is a chart illustrating hybrid evolutionary computation linking function with hybrid synthesis.

FIG. 24 is a list illustrating the typology of hybrid techniques for probabilistic simulations.

FIG. 25 is a list illustrating the typology of hybrid techniques for evolutionary computation.

FIG. 26 is a list illustrating the typology of hybrid techniques for (artificial neural) networks.

FIG. 29 is a list illustrating the typology of applications matched to hybrid techniques.

FIG. 30 is a list illustrating the typology of task categories matched to hybrid techniques.

FIG. 31 is a list illustrating the typology of main processes matched to main technique categories.

FIG. 32 is a list illustrating the typology of main processes matched to other technique categories.

FIG. 33 is a list of organizing models of computational processes.

FIG. 41 is a chart illustrating the operation of a dynamic enterprise management system.

FIG. 42 is a chart illustrating the operation of computer and communication networks.

FIG. 43 is a chart illustrating the operation of commercial systems.

FIG. 44 is a flow chart illustrating the operation of bio systems.

FIG. 45 is a flow chart illustrating the operation of collective robotics systems.

DETAILED DESCRIPTION OF THE INVENTION

Figure 3:
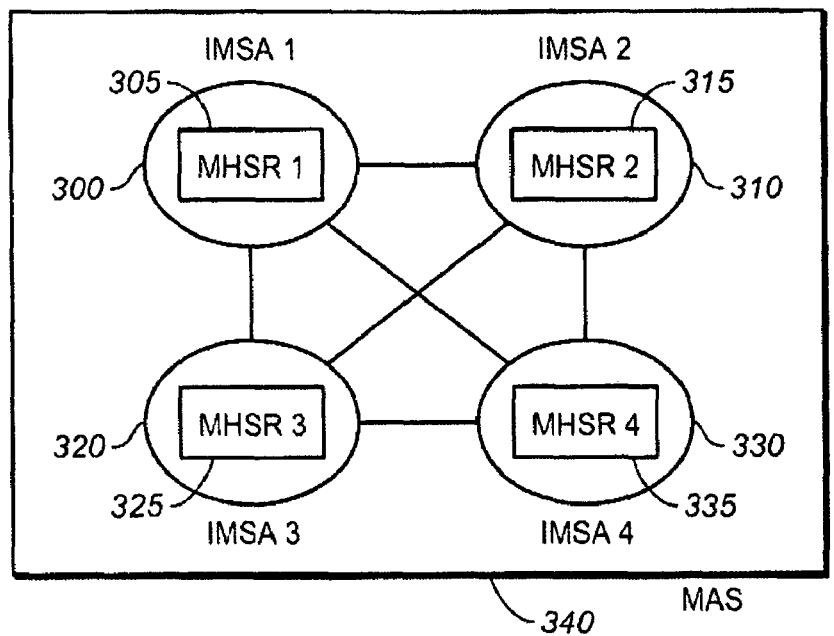
FIG. 3 is a schematic diagram of the stationary MHSR structure.

The present disclosures illustrate in detail the main ideas of the present system. Since the present invention has numerous embodiments, it is not intended to restrict the invention to a single embodiment.

The system, apparatus and methods incorporated in the present invention are implemented by using software program code applied to networks of computers. Specifically, the invention represents complex adaptive computer software that generates program code, anticipates and interacts with its environment, exhibits mobility and solves problems on demand in changing environments. One main effect of the present invention is the emergence of self-organization processes functioning within a complex computer system. The main instrument for operation of this self-organizing system is the mobile hybrid software router (MHSR). The MHSR integrates with either complex mobile software code, such as an intelligent mobile software agent (IMSA), or computer hardware, such as a field-programmable gate array (FPGA), application specific integrated circuit (ASIC) or microprocessor.

While the concept of a computer or communications "router" has different meanings, it has traditionally been associated with the unidirectional forwarding of signals from one source to another, similar to a switch or traffic light. In most cases, a router has been associated with the integrated signal processing of multiple incompatible systems. In these cases, the router is generally a hardware box that passively forwards signals as they are input into the hardware.

In the present case, however, a "router" is organized as a mechanism to assimilate specific combinations of computer techniques for specific applications to solve problems in real time. That is, rather than a passive entity that processes inputs and outputs, the present invention is primarily a software program that moves from machine to machine, integrating with hardware apparatus, solving problems on-demand and anticipating problems on the fly. When combined with multiple routers, the present invention exhibits social intelligence. This next-generation router creates an opportunity for software to be auto-programming and for systems that interoperate to be self-organizing.

Unlike traditional passive and stationary input-output routers, the present invention exhibits (1) mobility, (2) analytical capability, (3) evaluation capability, (4) decision-making capability, (5) scenario-development capability, (6) simulation modeling, (7) simulation-selection capability, (8) changing selection criteria development, (9) synthetic capability, (10) interaction capability, (11) anticipation capability, (12) optimal fitness testing, (13) multiple parallel functioning, (14) multi-functional capability and (15) experimentation.

Taken together, these processes allow the MHSR to exhibit novel functionality in computational and engineering systems.

In order to accomplish these operational goals, the present invention acts analogously to numerous biological constructs. In fact, emulation of biological systems and aspects has been a key part of the artificial intelligence community for two generations. The present invention solves numerous problems in AI by presenting novel techniques and combinations of techniques, including those drawn from an understanding of biological mechanisms and social processes, for the automation of computational processes.

The main apparatus of the MHSR operates primarily by combining specific computational or mathematical techniques to solve problems. The classes of techniques that are used are generally grouped into (a) probabilistic simulations (PS), (b) evolutionary computation (EC), (c) machine learning and (d) artificial neural networks (A-NN). Selections from each of these main classes of techniques are combined to generate distinctive hybrid techniques for solving unique classes of computer or engineering problems.

This detailed description of the figures is divided into sections that explain: (I) the general system architecture and dynamics, (2) the main computational or mathematical techniques, (3) the process of combining computational techniques to create hybrid techniques, (4) the integration of a MHSR with an IMSA to create automated programming capability and social intelligence, (5) the integration of a MHSR with FPGAs, (6) the typologies of specific hybrid combinations of computational or mathematical techniques, (7) the discussion of the MHSR mechanism and processes and (8) several main complex system applications of the MHSR.

General System Architecture and Dynamics

FIG. 1 illustrates the layers of the MHSR system. The first layer shows a hybrid technique typology. Specific techniques are combined in order to create distinctive hybrid techniques, which are then organized into a series of logical categories.

The second layer shows the typology of combinations of hybrid techniques for specific applications. Since specific hybrid techniques are used to solve specific problems, present simulations or optimize solutions, combinations of hybrid techniques are organized at this layer to affect linkage between hybrid techniques and specific applications.

The third layer shows the router implementation of hybrid technique combinations. The MHSR is the primary tool that implements unique hybrid techniques and combinations of techniques. The integration of the various techniques and processes is performed at this level.

In the fourth layer we see the implementation of the router with the IMSA. The MHSR integrates with IMSAs, which activate specific combinations of techniques in mobile operations. Specific applications are activated via various techniques and processes at this level.

The fifth layer organizes group behaviors of multiple routers. The coordination, cooperation and competition of MHSRs and IMSAs take place at this level, which makes possible emergent and self-organizing behavior.

Automated programming of a network of multiple IMSAs and routers is performed at the sixth layer. The continuous operation of problem-solving, optimization and simulations occurs at this system level.

The MHSR is integrated with FPGAs, as well as ASICs and microprocessors, at the seventh layer. The integration of the MHSRs (and IMSAs) into hardware enables the possible activation of electrical and mechanical functions in a complex system.

In the eighth layer, a system of multiple FPGAs, or other hardware, is organized to operate as a multi-agent system for integration with a distributed computer system.

Finally, the collective behavior of self-organizing networks occurs at the ninth layer. In its accumulated functionality, the present system provides mechanisms for the integration of a complex system that incorporates collective behaviors, automated programming, environmental adaptation and self-organization.

The general architecture of the system in which an MHSR operates is described in FIG. 2. The MHSR uses program code to analyze and synthesize computational or mathematical techniques, the data for which are stored in its database. After a problem (230) is encountered, the MHSR (240) accesses specific computer or mathematical techniques to solve the problem, including EC (200), PS (205), A-NN (210), machine learning (215) and other computer techniques (220). The techniques are hybridized by the MHSR and output as task solutions. Tasks include problem-solving (245), optimization (250), simulations (255) and learning (260). These tasks are, in turn, used in specific applications. Examples of complex system applications include enterprise management (270), communications and computer network management (275, commercial system management (280), bio systems management (285), collective robotics system management (290) and other complex systems (295). See also FIGS. 34-40.

FIG. 3 shows the stationary MHSR structure. In this figure, several MHSRs are integrated into several IMSAs. The IMSAs communicate with one another within the Multi-Agent System (MAS). See also FIGS. 18, 19, 34 and 35 for a view of the IMSA operation and mobility capability.

Figure 4:
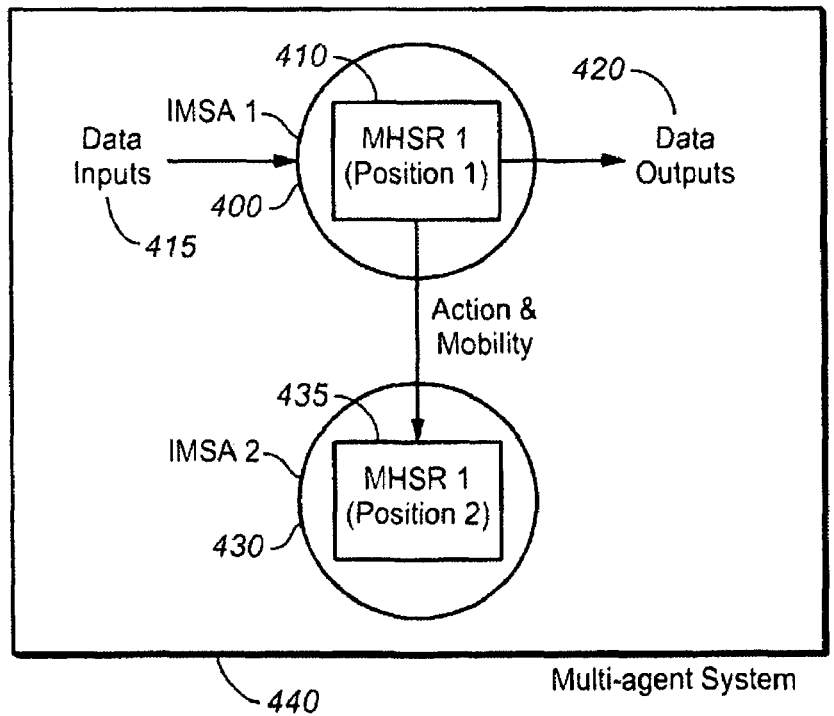
FIG. 4 is a schematic diagram of MHSR operation.

In FIG. 4 the MHSR operation is described. Embedded in IMSA 1 (at 400), MHSR 1, at position 1 (410), processes data inputs (415) and data outputs (420). At a threshold event, the MHSR moves from position 1 to position 2 (435) within IMSA 2 (430) in a MAS.

Figure 5:
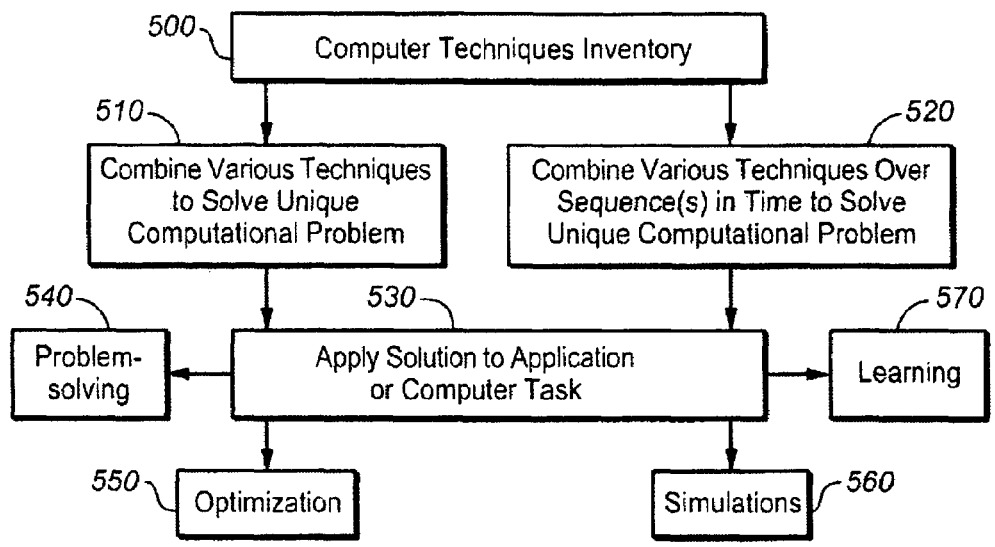
FIG. 5 is a flow chart of hybrid control strategies.

Hybrid control strategies are described in FIG. 5. After the computer techniques inventory (500) is accessed, various computational or mathematical techniques are combined (510), or sequences of techniques are combined (520), to solve unique computational problems. The solutions are applied to specific computer tasks (530), including problem-solving (540), optimization problems (550), simulations (560) and learning problems (570).

Main Computational Techniques

FIGS. 6 to 10 generally describe the main computational techniques of evolutionary computation and artificial neural networks. These main techniques are core elements of the MHSR.

Figure 6:
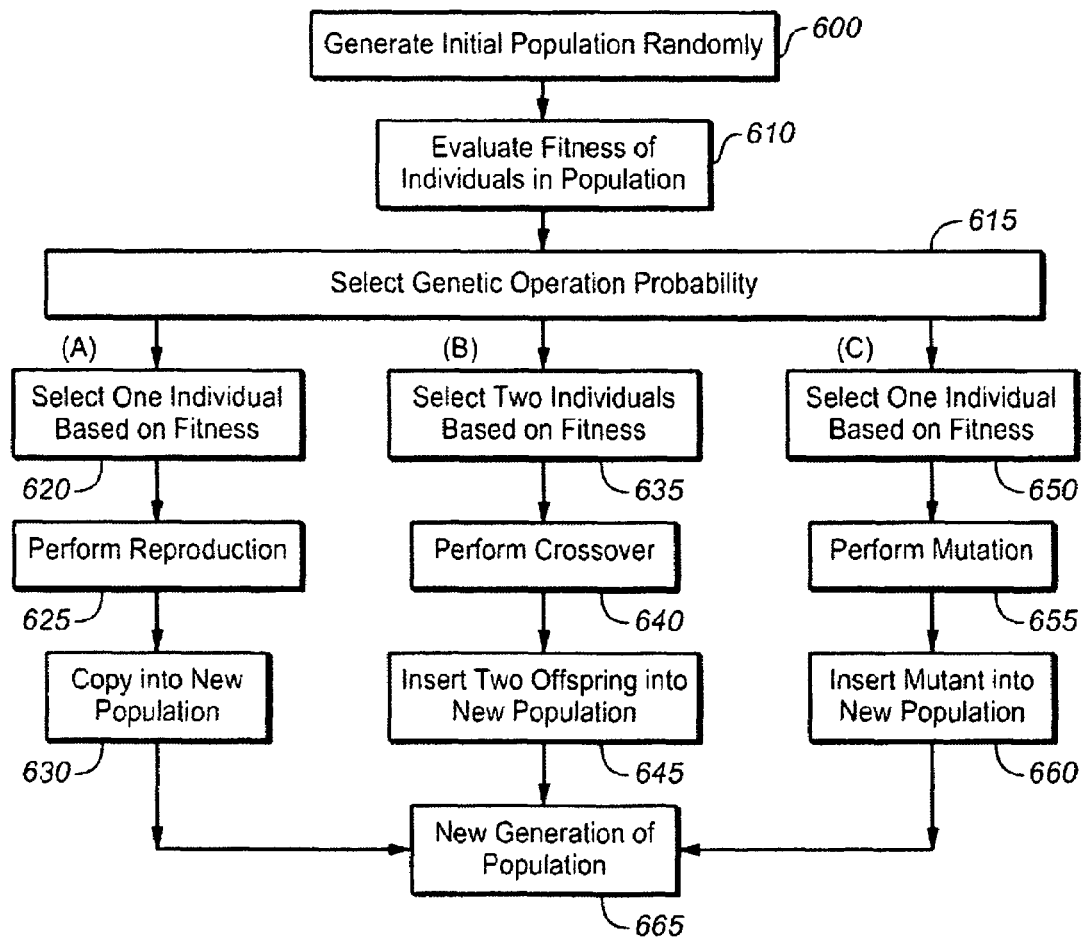
FIG. 6 is flow chart of a genetic algorithm.

FIG. 6 is a flow chart of a genetic algorithm taught by Koza in Genetic Programming (1992). After an initial population is randomly generated (600), the fitness of individuals is evaluated (610) and a genetic operation is selected probabilistically (615). Three operations are performed in parallel. At (A), an individual is selected based on fitness (620), reproduction is performed (625) and a copy is introduced into the new population (630). At (B) two individuals are selected based on fitness (635), crossover is performed (640) and two offspring are inserted into the new population (645). At (C) an individual is selected based on fitness (650), a random mutation is performed (655) and the mutant is inserted into the new population (660).

The new generation of the population then develops (665) from the combination of the outputs of (A), (B) and (C). This process of the genetic algorithm (GA) operation then repeats with successive generations until a problem is solved. In genetic programming (GP), (C), the mutation step, is omitted, according to the Koza strategy. In the case of evolutionary programming (EP), (B), the crossover step, is omitted. In this way, the three main models of evolutionary computation (EC), GA, GP and EP, are distinct. However, different versions of this main process may be used in EC modeling.

FIG. 7 illustrates hybrid evolutionary computation linking function with hybrid synthesis. The three main operations—mutation, crossover and reproduction—are linked to a random Monte Carlo (MC) technique, a random MC technique within constraints and a nonrandom constrained combination, respectively. The problem-solving goal is linked to the creation of generations for seeking a solution to a particular functional task. Testing the fitness of (a) each generation and (b) the success of various combinations is linked to optimal solution and optimal combination, respectively. In the course of the general development of the EC process, multiple generations of programs are bred by using Bayesian analysis to focus growth; finite numbers of generations are time-constrained using fuzzy logic (FL); successive generations are optimally focused by using partially-directed filters to limit their development; and each successive generation's success is contingent on the success of the most recent generation. The constraint mechanisms imposed on the main EC processes by the combining of specific EC aspects with specific hybrid technique syntheses promote increased efficiency and optimal operation.

Figure 8:
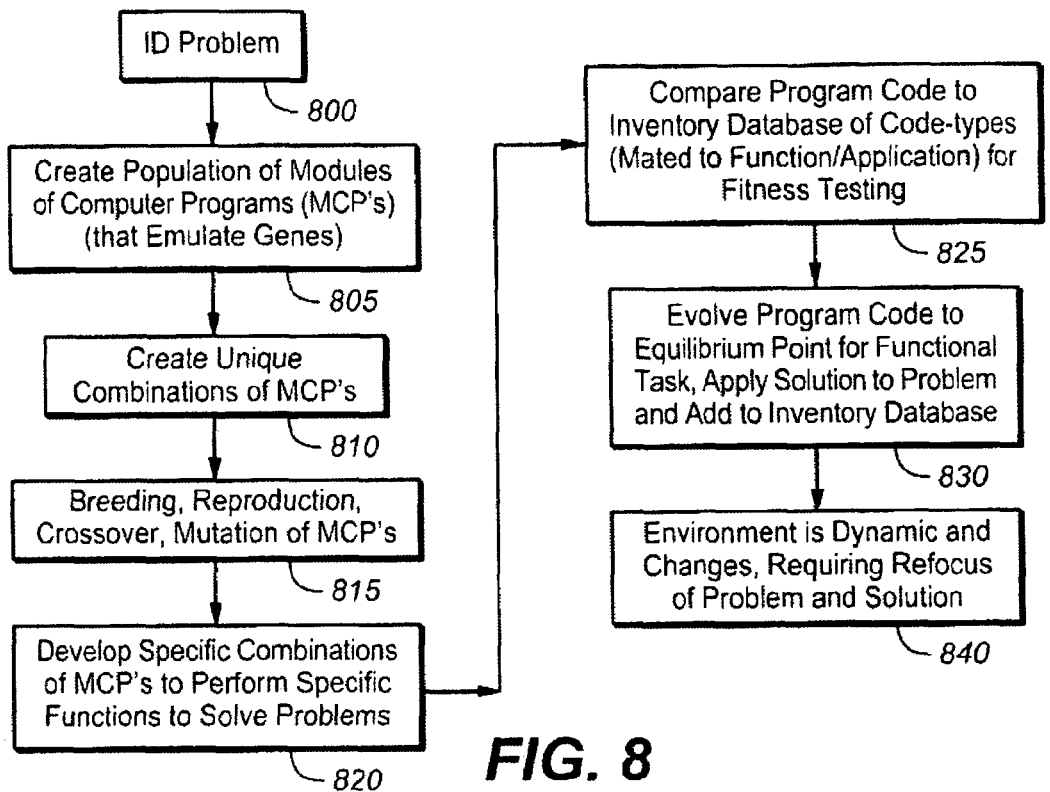
FIG. 8 is a flow chart showing a DNA analogy to genetic programming.

FIG. 8 shows an analogy between DNA and genetic programming. After a problem is identified (800), a population is created consisting of modules of computer programs (MCPs) that emulate genes (805), and unique combinations of MCPs are created (810). The main processes of breeding, reproduction, mutation and crossover of MCPs are implemented (815). Specific combinations of MCPs are then developed to perform specific functions to solve problems (820). Candidate MCP code is compared to an inventory of prior successful MCP code types (which are mated to the successful prior solution of function and applications) for fitness testing (825). Program code is evolved to an equilibrium point for application to a functional task, the solution to the problem is applied and the solution is added to the inventory database (830). Since the environment is dynamic and changing, the problem and solution by necessity continually refocus (840).

Support Vector Machines (SVM) are a kernel-based machine learning computational technique that shares functions of EC as well as fuzzy logic and the probabilities techniques of MC and Bayesian analysis for application in dynamic environments to solve complex optimization problems. SVM is itself a hybrid technique that is presented as a novel technique category, i.e., machine learning, distinct from the three main technique categories. For the purposes of this discussion, however, SVM is sometimes categorized as a probabilities technique. In solving learning problems SVM is a competitor with A-NN methods.

Figure 9:
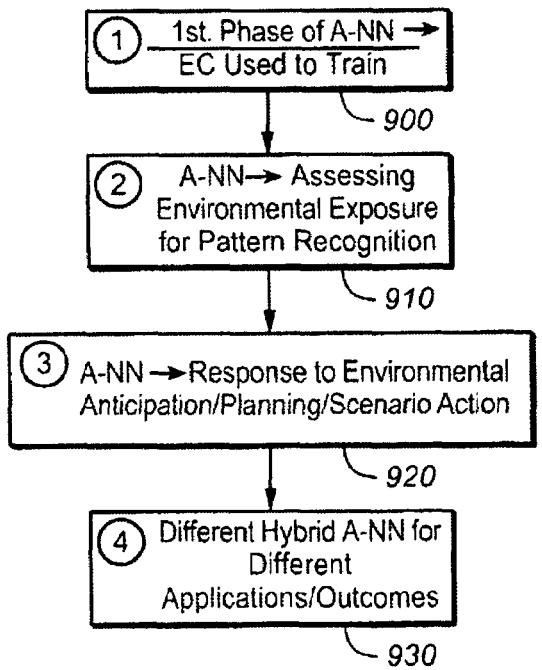
FIG. 9 is a flow chart describing the main phases of an artificial neural network (A-NN) process.

Artificial neural networks (A-NNs) are complex systems that use feedback to train processes for optimized learning. The use of A-NNs by MHSRs represents a major computational technique to solve problems, develop simulations and optimize solutions. In FIG. 9, a flow chart shows the main operation of an A-NN. In the first phase of an A-NN, EC is used to train the A-NN (900), particularly to develop and optimize the training weights. After exposure to its environment, pattern recognition occurs and an assessment is made (910). The A-NN responds to the environment, with advanced-capabilities development of scenario anticipation and planning (920), and then action is taken. Different applications and outcomes require will require different hybrid A-NNs (930).

A-NNs are a general category with several main types. Included in the general typology of A-NNs are Feedforward NN, Recurrent NN (including Hop field Networks), Stochastic NN (including Boltzmann Machines), Bayesian NN, Evolutionary A-NN, Spiking A-NN and Asynchronous Spiking A-NN, Pulsed A-NN, Hebbian Learning models and (Kohonen) self-organizing networks. Please see FIG. 26 for a list of A-NNs.

Figures 10, 11:
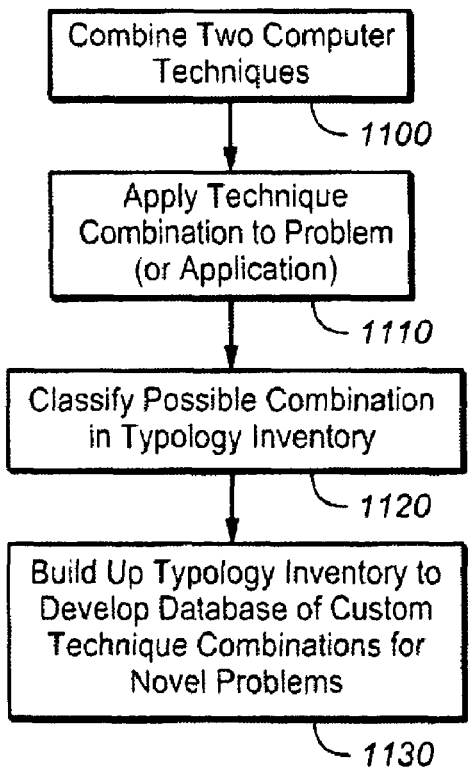
FIG. 10 is a chart showing A-NN functions linked to hybrid combinations.
FIG. 11 is a flow chart showing the hybrid-technique combination process.

FIG. 10 shows the A-NN functions linked to hybrid combinations. Each of the following main neural network functions involves the use of evolutionary computation: (a) weight computation, (b) hidden multi-perceptron layer(s), (c) environmental input and change identification, (d) social learning and (e) network optimization. In addition, multiple hybrid artificial neural network models involve various combinations of hybrid computer techniques, including probabilities simulations. See also FIG. 26 for a discussion of the links between network types and hybrid combinations.

Hybrid Techniques

FIG. 11 shows the hybrid technique combination process. After two computer or mathematical techniques are combined (1100), the technique combination is applied to a specific problem or application (1110), and possible successful combinations are classified in a typology inventory (1120). By accumulating specific unique hybrid technique combinations, a typology inventory is developed in an external database for custom technique combinations formulated in order to solve novel problems (1130). An external database, or a combination of databases in a distributed network, is then accessed when a new problem is encountered so that analysis of the problem and past solutions will lead to a novel hybrid technique solution. See also FIG. 40 for a discussion of interaction with external databases. The mobility and external database access functions allow the MHSR to add or drop program code so as to maintain optimal efficiency in computational processes.

MHSRs contain their own databases. An MHSR accesses its own database by requesting a data search using an object relational database management system. In advanced systems, the MHSR may operate within a (distributed) transformative spatio-temporal object relational (T-STOR) database management system, which is time- and space-sensitive, and which is intended to process massive data sets in high performance systems that require interaction with dynamic environments in real time.

Figure 12:
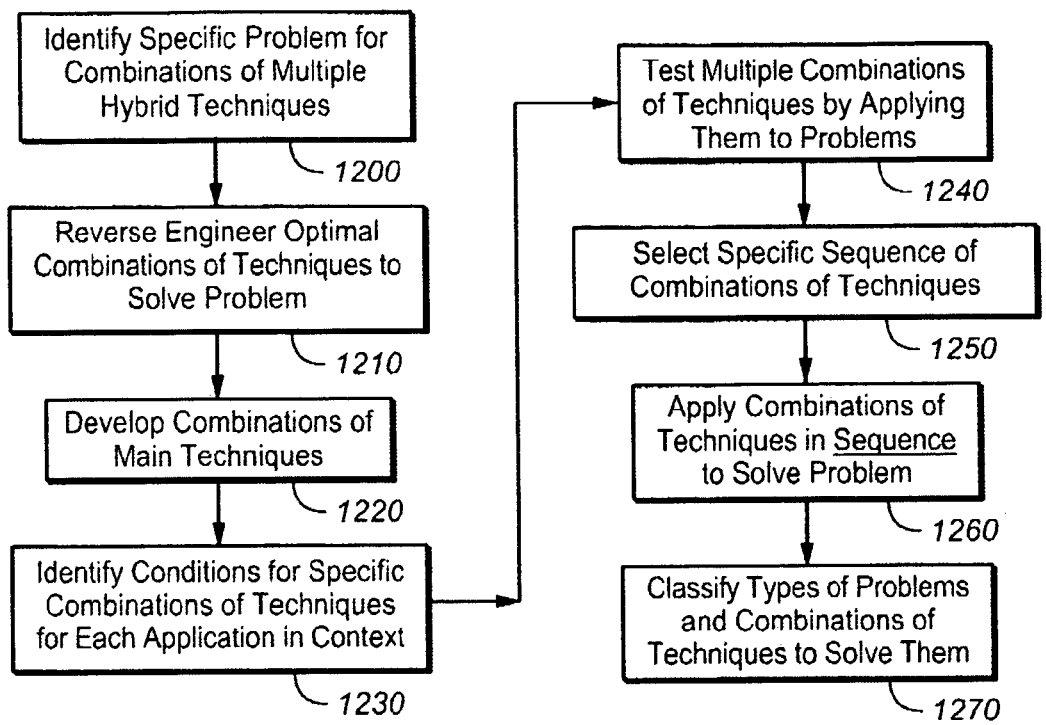
FIG. 12 is a flow chart illustrating the process of combining computational techniques.

FIG. 12 illustrates the process of combining computational techniques. First, a specific problem is identified which requires solutions from combinations of multiple hybrid techniques (1200). Computational or mathematical techniques are combined to solve the problem by reverse engineering from the problem to the solution (1210). Specific main techniques are then combined (1220), and conditions for specific combinations of techniques for each application in context are identified (1230). After multiple combinations of techniques are tested by applying them to problems (1240), specific combinations of techniques are selected (1250). The combinations of techniques are applied in a specific sequence in order to solve the problem (1260). Finally, specific types of problems are organized and classified, along with the hybrid techniques used to solve them (1270).

Figure 13:
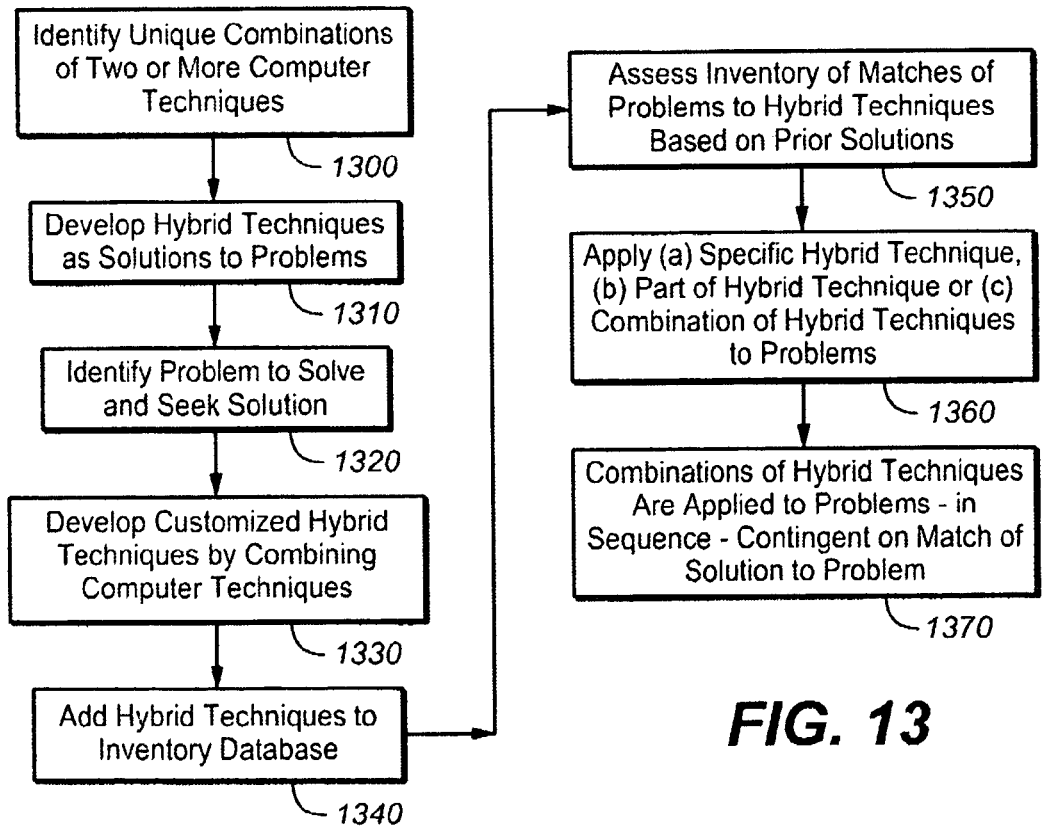
FIG. 13 is a flow chart showing the process of matching hybrid techniques to solve problems.

FIG. 13 shows the process of matching hybrid techniques to solve problems. Unique combinations of two or more computer or mathematical techniques are identified (1300), and hybrid techniques are developed as solutions to problems (1310). After identification of a problem, a solution is sought (1320), and customized hybrid techniques are then developed (1330). The hybrid techniques are added to the inventory database (1340), and the inventory of matches between problems and hybrid techniques culled from prior solutions is assessed (1350). Either a specific hybrid technique, a part of a hybrid technique or a combination of hybrid techniques is applied to the problem (1360), and combinations of hybrid techniques are applied to problems in sequence, contingent upon the solution matching the problem (1370).

Figure 14:
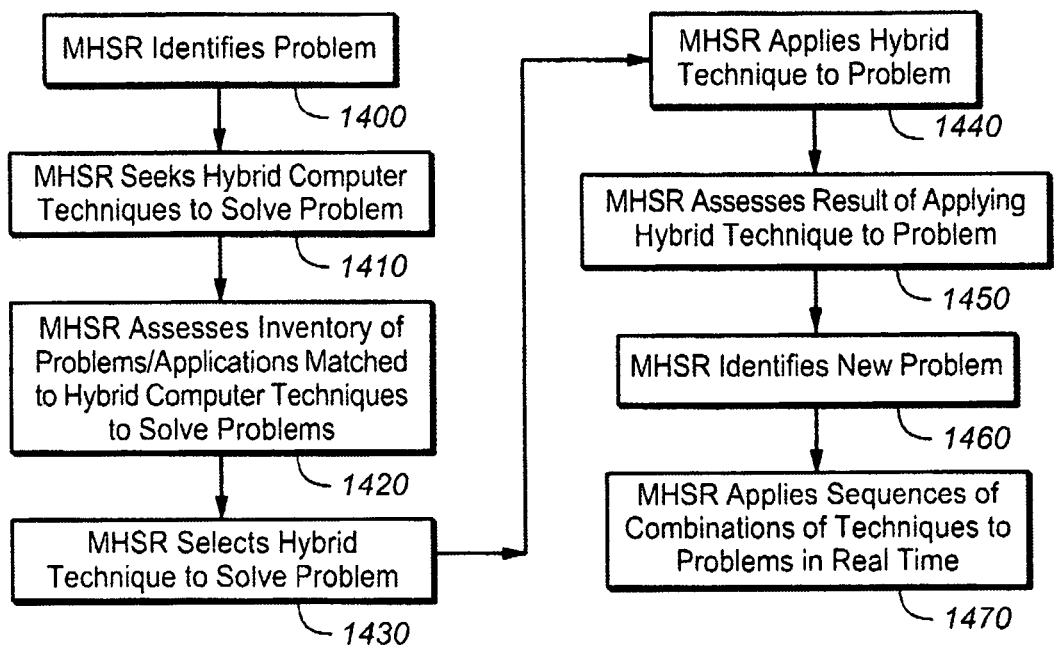
FIG. 14 is a flow chart showing the MHSR implementation of hybrid techniques to solve problems.

FIG. 14 shows the MHSR implementation of hybrid techniques to solve problems. The MHSR identifies a problem (1400), seeks hybrid computer or mathematical techniques to solve problems (1410), and assesses an inventory of problems and applications matched to hybrid computer techniques to solve problems (1420). The MHSR selects a hybrid technique (or combination of techniques) to solve a problem (1430) and applies the technique(s) to a problem (1440). The MHSR obtains feedback by assessing the results of applying the hybrid technique(s) to the problem (1450). The MHSR identifies a new problem (1460) and either returns to the step at 1410 to solve the problem or applies sequences of combinations of techniques to solve problems in real time (1470).

Figure 15:
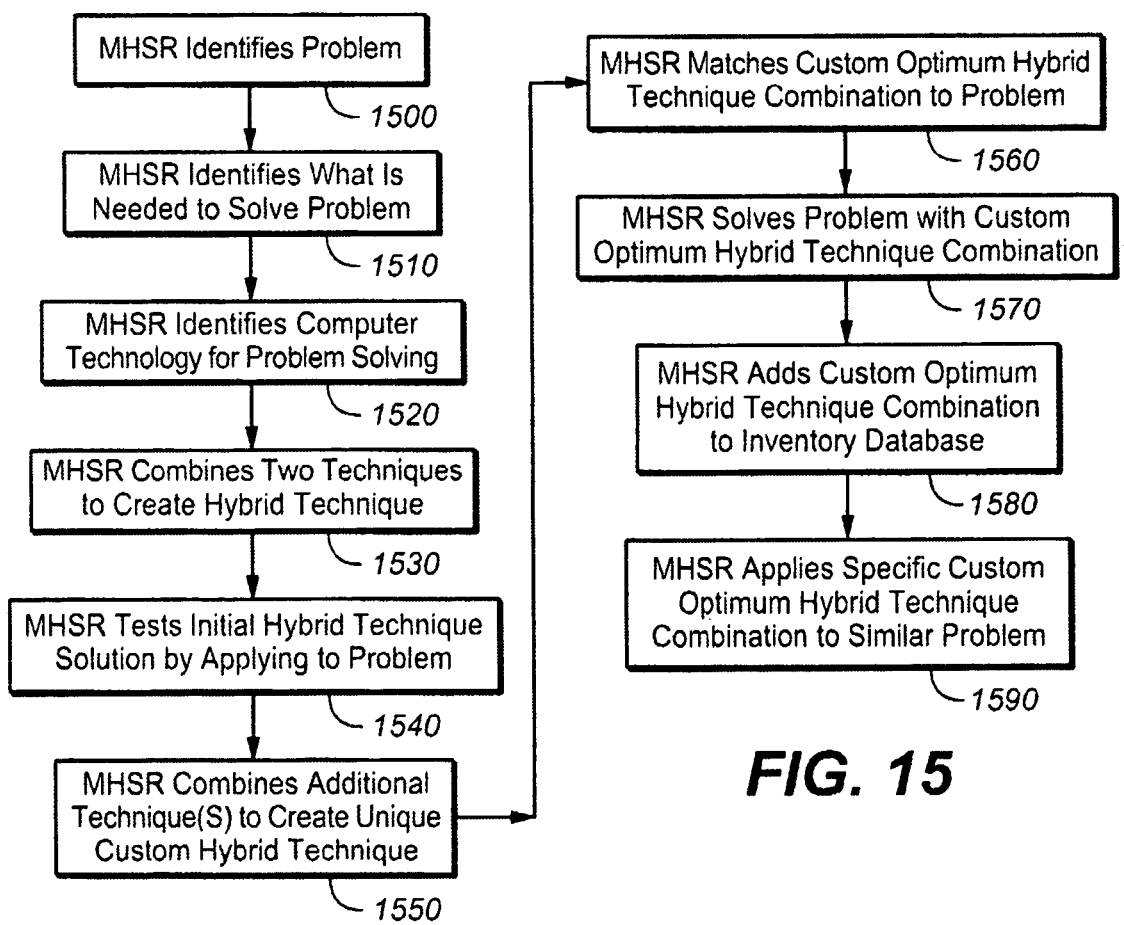
FIG. 15 is a flow chart illustrating the process of continuously optimizing combinations of unique hybrid techniques.

FIG. 15 illustrates the process of continuously optimizing combinations of unique hybrid techniques. After a problem is identified (1500), an identification determines what is needed to solve the problem (1510). Computational and mathematical techniques are identified for solving the problem (1520), and two techniques are combined to create a hybrid technique (1530). The initial hybrid technique solution is tested by applying it to the problem (1540). Additional techniques are then combined when needed to create unique custom hybrid techniques (1550). Custom optimum hybrid technique combinations are matched to the problem (1560), and the problem is solved by using the custom optimum hybrid technique combination (1570). The MHSR then either returns to step 1550 to combine additional techniques that may be needed to solve the problem or adds custom optimum hybrid technique combination(s) to the inventory database (1580) and henceforth adopts a similar technique to solve a similar problem (1590). See also FIGS. 34 to 40.

IMSAs: Automated Programming and Social Intelligence

Figure 16:
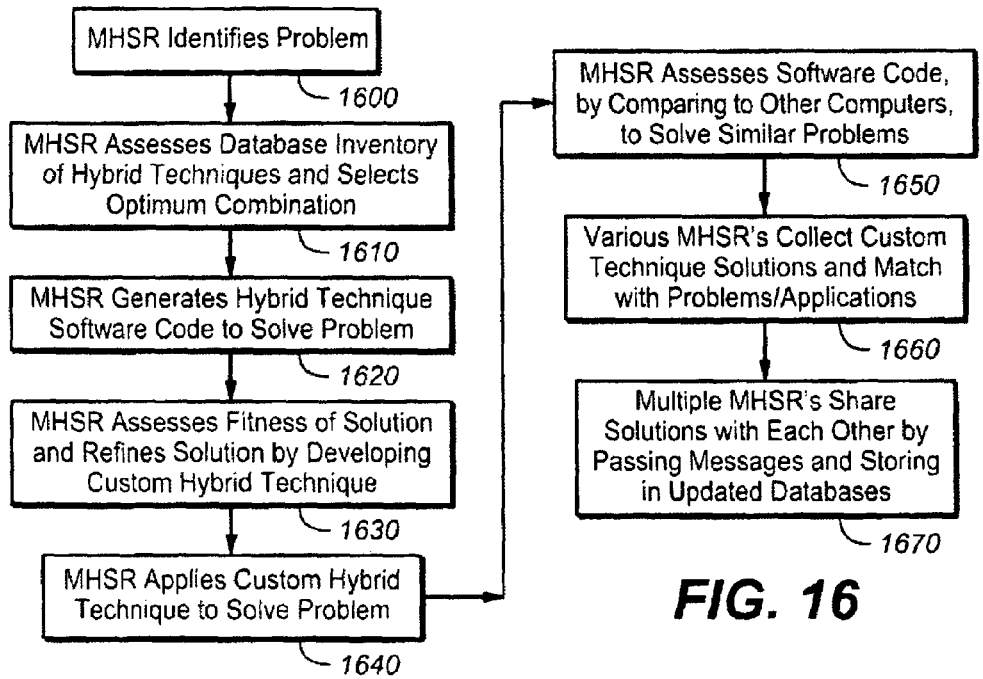
FIG. 16 is a flow chart describing problem-based solutions for automatic programming.

FIG. 16 describes problem-based solutions for automated programming. The MHSR identifies a problem (1600) and accesses the database inventory of hybrid techniques to select an optimum combination to solve the problem (1610). The MHSR generates hybrid technique program code to solve the problem (1620), assesses the fitness of the solution and refines the solution by developing custom hybrid techniques (1630). The MHSR then applies the custom hybrid technique to solve the problem (1640) and passes software code to other computers to solve similar problems (1650). Various MHSRs then collect custom technique solutions and match these with problems, tasks or applications (1660). Multiple MHSRs share solutions with each other by passing messages amongst themselves and storing the hybrid techniques in updated databases (1670).

Figure 17:
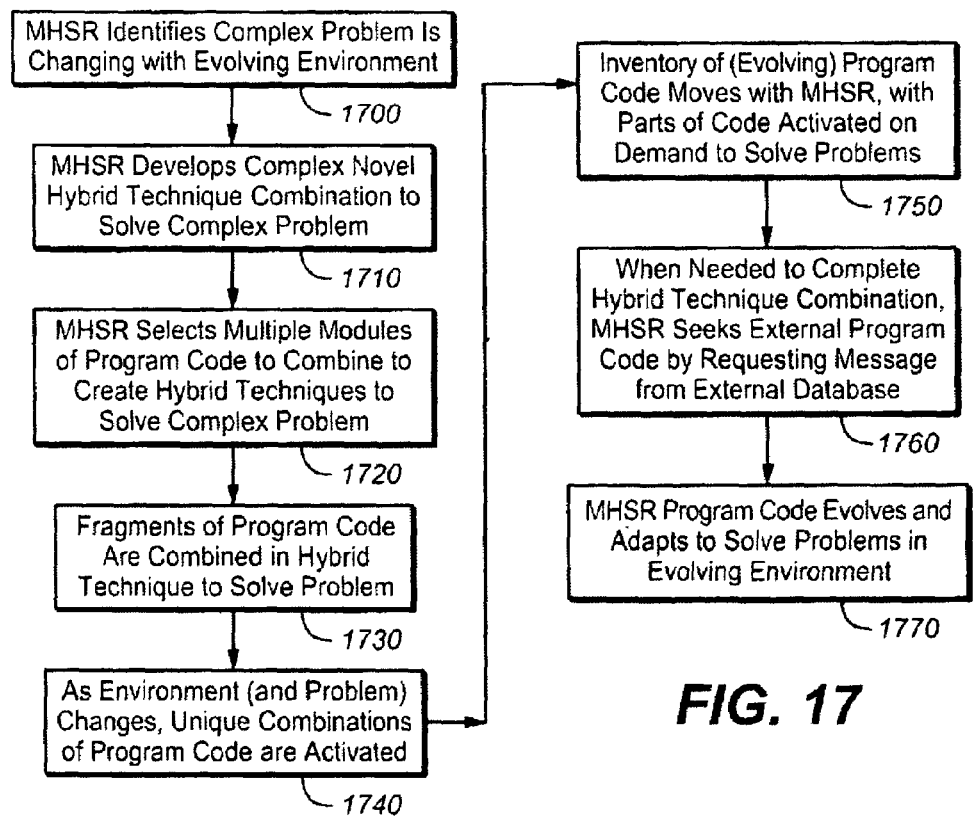
FIG. 17 is a flow chart showing program evolution for problem-solving within full program activation.

FIG. 17 shows program evolution to solve problems with full program activation. After the MHSR identifies a complex problem that is changing within an evolving environment (1700), it develops a complex novel hybrid technique combination to solve the complex problem (1710). The MHSR then selects and combines multiple modules of program code to create hybrid techniques in order to solve the complex problem (1720) and combines fragments of program code in a hybrid technique to solve the problem (1730). As the environment and problem change, unique combinations of program code are activated (1740), and the inventory of (evolving) program code moves with the MHSR, activating parts of the code on-demand to solve specific programs (1750). The MHSR seeks external program code by requesting a message from an external database when needed to complete hybrid technique combinations (1750). Finally, as the program code evolves, it adapts to solve problems in the evolving environment (1760).

The MHSR integrates with IMSAs, complex software agents, or computer hardware apparatus, including microprocessors, ASICs or FPGAs. The integration of MHSRs (via IMSAs) with FPGAs, discussed below, represents a model for environmental adaptation because evolvable hardware is used. When multiple CP-FPGAs are combined with MHSRs, the interactive process becomes perpetually self-organizing.

An application-specific (AS-) MHSR is distinguished from a multi-functional (MF-) MHSR. These types of MHSRs are software counterparts of ASICs and FPGAs. The AS-MHSR is a software equivalent to an application specific integrated circuit (ASIC) which performs a specific function, such as processing the data from a camera's photo cell to memory. In contrast, the MF-MHSR may switch roles between specific functions, similar to an FPGA. In a social context, AS-MHSRs interact within IMSAs by using the division of labor in which a number of agents coordinate a task by using only a combination of specific functions. On the other hand, MF-MHSRs are integrated into IMSAs with the ability to carry out many purposes. While it may be possible to perform a task with fewer MF-MHSRs, the lag time between switching roles may be inefficient relative to using a number of AS-MHSRs. See the discussion of FPGAs below.

Figure 18:
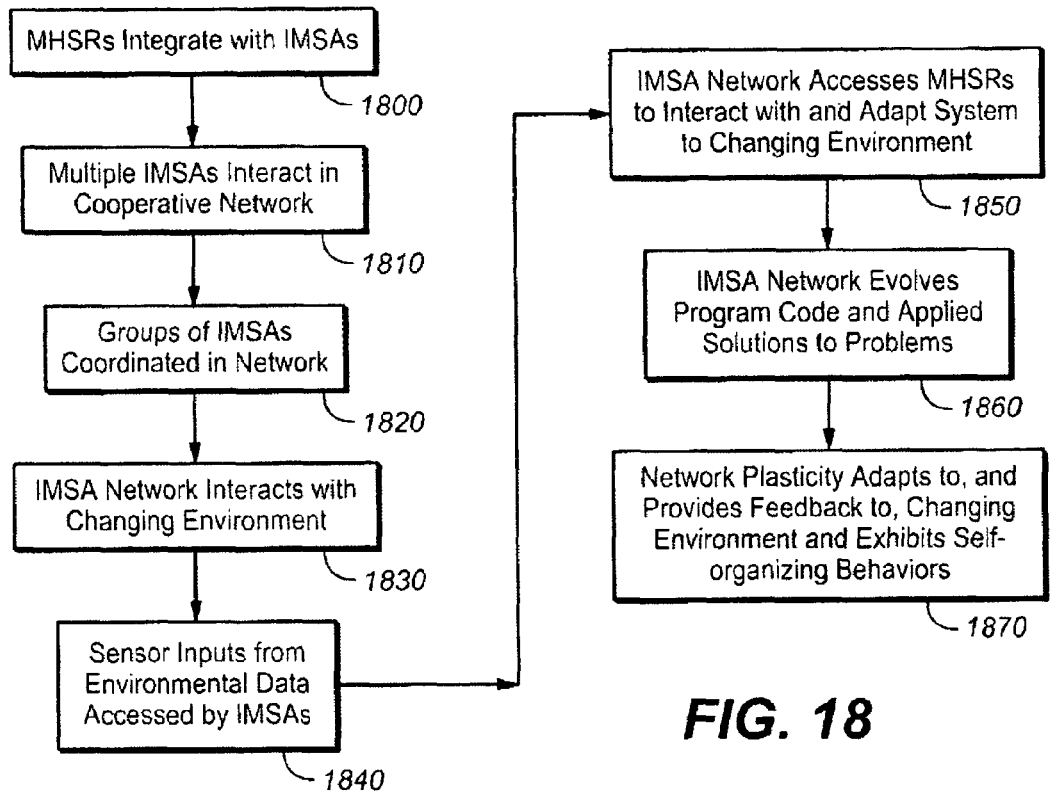
FIG. 18 is a flow chart showing intelligent social adaptive modeling with multiple MHSRs integrated in a network of intelligent mobile software agents (IMSAs).

FIG. 18 illustrates intelligent social adaptive modeling with multiple MHSRs integrated in a network of IMSAs. MHSRs integrate with IMSAs (1800), and multiple IMSAs interact in a cooperative network (1810). Groups of IMSAs are coordinated in the network (1820), and the IMSA network interacts with a changing environment (1830). Sensor inputs from environmental data are accessed by IMSAs (1840), and the IMSA network accesses MHSRs to interact with the system and adapt it to the changing environment (1850). The IMSA network evolves program code and applies solutions to problems (1860). Network plasticity adapts to, and provides feedback to, a changing environment and exhibits self-organizing behavior (1870).

Figure 19A:
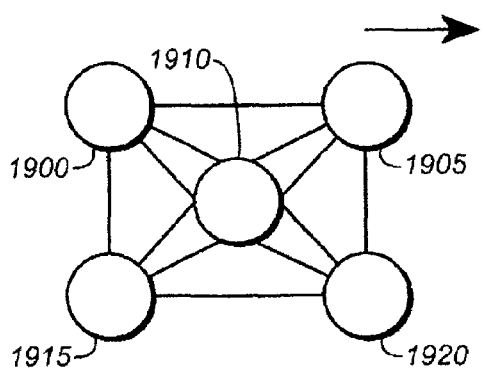
FIG. 19 is a schematic diagram showing interactive coalitions of cooperative IMSAs.
Figure 19B:
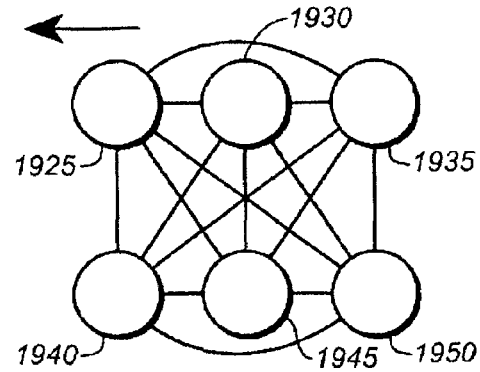

FIG. 19 shows interacting coalitions of cooperative IMSAs. Two clusters of IMSAs are shown, consisting of the first network, (1900) to (1920), and the second network, (1925) to (1950). The networks interact within each cluster and interact among themselves. The clusters of coalitions of cooperative IMSAs may compete and set up a tournament to accomplish a time-sensitive goal.

FPGAs

Figure 20:
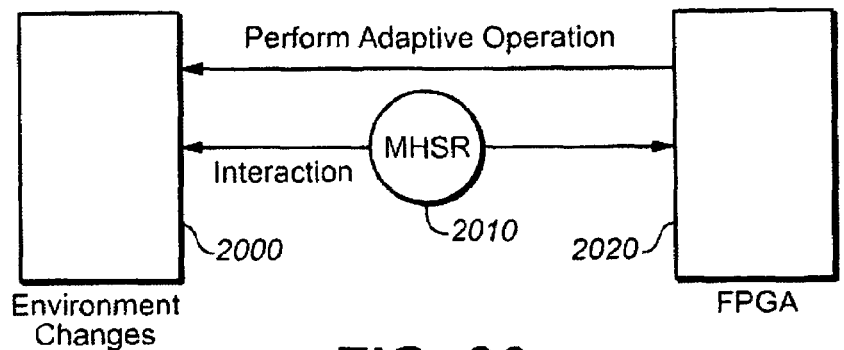
FIG. 20 is a schematic diagram showing the interaction of an MHSR and a field programmable gate array (FPGA).

FIG. 20 shows the interaction between an MSHR and a field-programmable gate array (FPGA). The MHSR (2010) integrates with the FPGA (2020) and interacts with a changing environment (2000). The FPGA performs adaptive operations via the MHSR, which interacts with the environment by receiving instructions to execute program code to reprogram its configuration.

Application-specific integrated circuits (ASICs) accelerate the operation of particular applications relative to the traditional architecture of microprocessors by focusing operation on a specific function. An example of the ASIC architecture is an integrated circuit in camera which processes the photo sensor data directly to a memory. The camera processor processes only a single function and is structured to rapidly carry out this function.

Continuously programmable field-programmable gate arrays (CP-FPGAs) carry out shifts from one ASIC position to another in order to accelerate computer operations for more than one function. Because of their ability to continuously modify their structure for varied applications, CP-FPGAs may be thought of as evolvable hardware (EWH). CP-FPGAs can perform various functions in a rapid manner but must assume an intermediary position to restructure at a particular phase. Overall, the CP-FPGA performance is accelerated relative to a traditional microprocessor that must continually fetch new program code from memory to perform varied functions. The effect of the use of EHW is that computational processes may be accelerated for operation in complex adaptive environments.

Figure 21A:
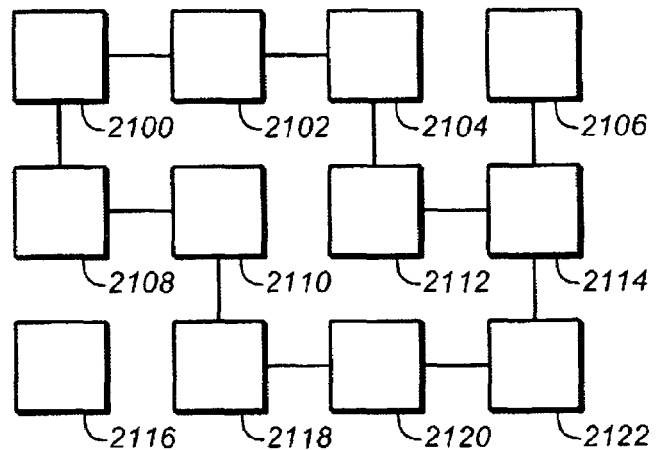
FIG. 21 is a schematic diagram showing the restructuring process of adaptive gates of continuously programmable (CP-) FPGAs.
Figure 21B:
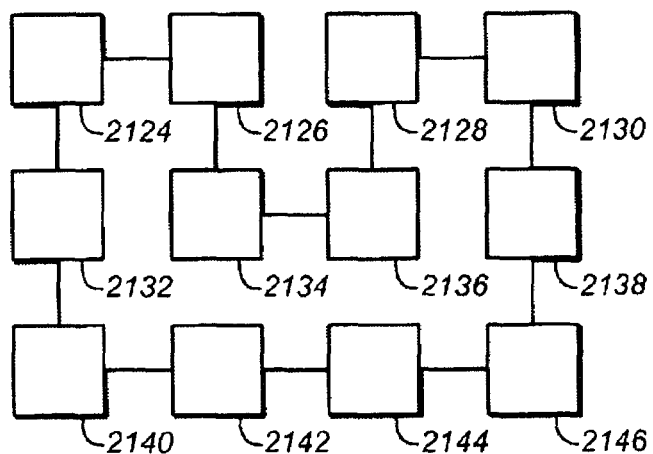

FIG. 21A shows the first phase of the restructuring process of adaptive gates of CP-FPGAs. In the first phase, the gates are structured as shown in order to perform a specific operational function. However, in the second phase of the process, in FIG. 21B, the gates between the main sections of the FPGA are modified to promote the operation of program code from the MHSR to perform another function. In order to be continuously operational, the CP-FPGA continues to transform the gate structure of the integrated circuit for a period of time until a task is completed.

In some cases, only parts of the FPGA will be modified (that is, only some of the gates will be taken off-line, transformed and redirected) in order to optimize processing. The multi-phasal partial continuous updating of a CP-FPGA structure can accelerate the process; by contrast, occasional wholesale structural transformation has more inefficiency and would be akin to making continuous pit-stops for major tune-ups in an auto race. This process repeats indefinitely to optimize the function for improved feedback to a changing environment.

Figure 22:
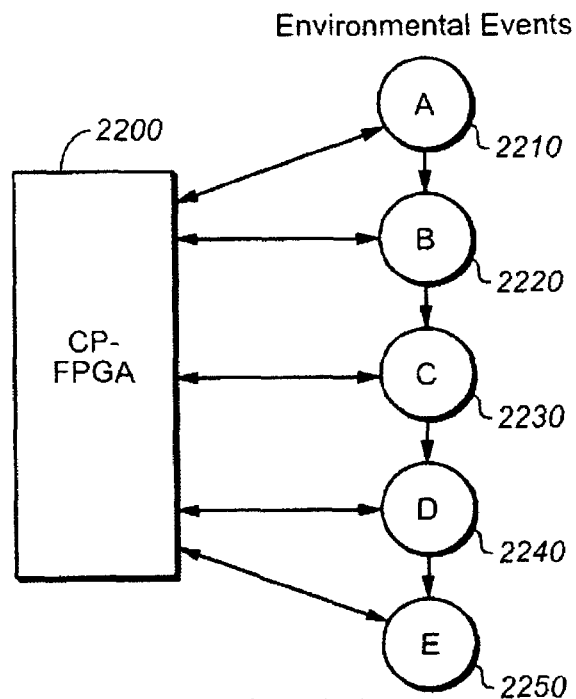
FIG. 22 is a schematic diagram showing the environmental interaction of a CP-FPGA.

FIG. 22 shows the environmental interaction of a CP-FPGA. A particular event, A (2210), changes to become event B (2220). Each of these events interacts with sensors accessible to the CP-FPGA. The MHSR within an IMSA assesses the change in environment between the events and activates the transformation from one FPGA position to another position. A third event, C (2230), further stimulates the transformation of the FPGA. The same steps are repeated for event D (2240) and event E (2250).

Figure 23:
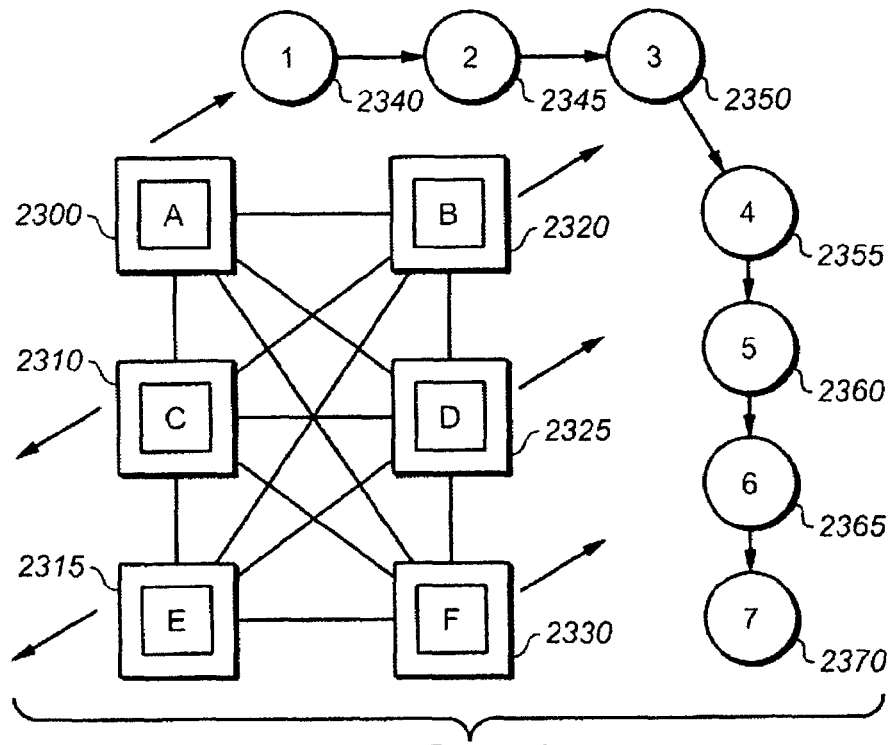
FIG. 23 is a schematic diagram showing the system of multiple CP-FPGAs with MHSRs.

FIG. 23 shows multiple CP-FPGAs, with MHSRs, linked in an array. This parallel structure of multiple CP-FPGAs allows for adaptive high-performance supercomputing resource capabilities. The event changes in a dynamic environment are shown from 1 (2340) to 7 (2370). In this case, the network's fixed-position CP-FPGAs are coupled to interact with the changing environment by using the MHSRs to receive environmental inputs, identify and solve problems and stimulate the CP-FPGAs to continuously transform their structure to optimize an application according to feedback from the changing environment. The MHSRs coordinate the synchronization of multiple CP-FPGAs with each other and with the environment.

In another embodiment, the array of CP-FPGAs may be mobile, with more complex interactive and feedback dynamics with the changing environment. In still another embodiment, multiple CP-FPGAs may be embedded in multifunctional computational, electrical or mechanical devices for additional functionality and for the facilitation of accelerated adaptive functionality.

Hybrid Technique Typologies

FIGS. 24 through 33 list various typologies of hybrid techniques. In FIG. 24, a typology of hybrid techniques is organized for probabilistic simulations (PS). Specific main probabilistic techniques are linked to minor techniques. In the case of Bayesian theory, Monte Carlo (MC) techniques are used to compute Bayesian integrals. In addition, EC, classification theory, regression theory and multi-regression theory are used by Bayesian theory to optimize techniques. The other main techniques will use various means to optimize their operations as well, as shown.

FIG. 25 shows a typology of hybrid techniques organized for evolutionary computing (EC). In the case of genetic algorithms (GA), genetic programming (GP) and evolutionary programming (EP), (a) MC, simulated annealing and Gaussian processes are applied to random mutations, crossover and reproduction, (b) Bayesian theory and fuzzy logic are applied to optimize feedback and assess fitness, and (c) A-NNs are applied to guide the direction of mutation development, crossover and reproduction. In the case of GP and EP, GAs are also used to assist in the evolution of programs.

FIG. 26 shows a typology of hybrid techniques organized for artificial neural networks (A-NNs) and its derivatives. It is clear that in addition to EC, numerous probabilistic simulations are applicable to A-NN.

Figures 27, 28:
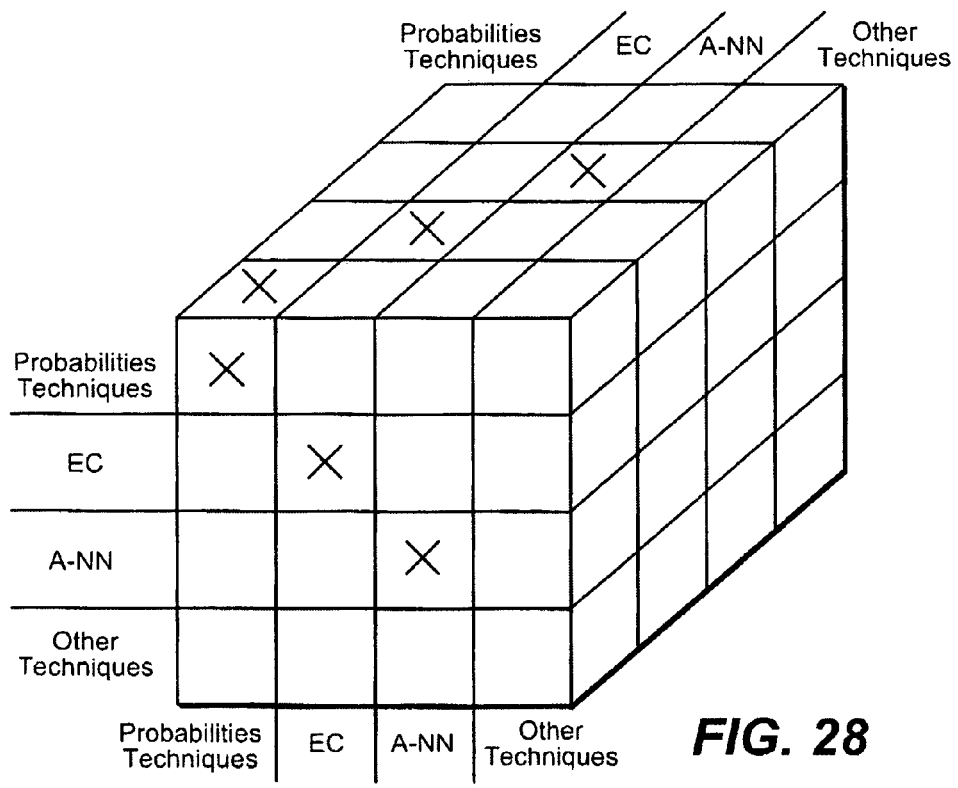
FIG. 27 is a chart illustrating the typology of two combinations of main techniques.
FIG. 28 is a cube (three-dimensional representation) chart illustrating the typology of up to three combinations of main techniques.

FIG. 27 shows the typology of two combinations of main techniques. Various combinations of main techniques are possible by joining the left axis, which lists the primary technique category, with the top axis. These hybrid techniques are then listed as (1, 3) for the Bayes primary and the EC secondary technique, in which Bayesian learning occurs by using EC to facilitate the main problem-solving goal. Similarly, (4, 2) signifies the combination of the primary A-NN technique to facilitate a particular function using the secondary MC technique in a hybrid configuration. The MHSR may access this table for rapid hybrid technique combination.

Multiple techniques can be combined as organized in FIG. 28. In this view, three techniques can be hybridized, with a main technique and two minor techniques. As in FIG. 27, the combination of specific techniques may be listed as (1, 3, 4), in which the first category is the primary technique, with the listed second and third categories constituting secondary and tertiary techniques that facilitate, and optimize, the primary technique. Though this cubic chart illustrates the main three computational categories of PS, EC and A-NN, in additional embodiments of the present system, numerous derivatives of each of these techniques can be used as well. Furthermore, there may be more than three combinations in a hybrid technique in multidimensional representations. Consequently, the number of these potential combinations of hybridization is very high.

FIGS. 29A and 29B shows the typology of application categories matched to hybrid techniques. Each application type is listed in one of the main categories of learning, optimization and simulation. For each hybrid technique, there is the application (listed in the heading) which are used to facilitate the application. The listed techniques may be variously combined to optimize the solutions to the application problems.

FIG. 30 shows the typology of task categories matched to hybrid techniques. In this case, the tasks are organized under the main categories of problem-solving, learning and optimization.

The typology of processes matched to main technique categories is shown in FIGS. 31 and 32. In FIG. 31, specific computational or mathematical techniques are listed in specific categories of problem-solving, learning, optimization, simulation, feedback and self-organizing processes. In FIG. 32, these techniques are listed in specific categories of data analysis, data classification, pattern recognition, prediction, forecasting anticipation, planning, decision-making, approximation, estimation and functioning under time-constraints.

FIG. 33 shows a meta-typology of computational processes. In the general typology are custom hybrid solutions, time-sensitive solutions and reverse engineered solutions. In addition, supplemental modules are available for MSHRs by remote access. For instance, access to a database for information on prior custom hybrid solutions would allow the development of a supplemental module. Combinations of hybrid techniques include narrow combinations, used primarily to solve problems involving individual tasks, complex combinations of hybrid techniques, and sequences of combinations of hybrid techniques, used primarily to solve complex problems.

MHSR Mechanism and Processes

Figure 34:
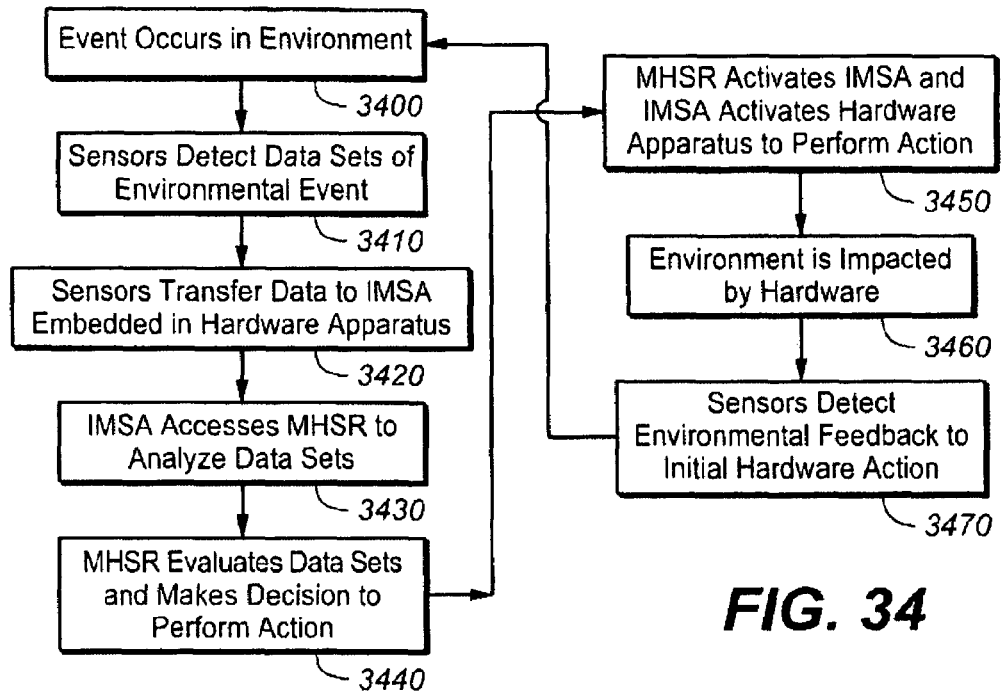
FIG. 34 is a flow chart showing the MHSR feedback mechanism and adaptation to the environment.

FIG. 34 shows the MHSR feedback mechanism and adaptation to the environment. After the event occurs in the environment (3400), sensors detect data sets of an environmental event (3410) and transfer data to an IMSA embedded in hardware apparatus (3420). The IMSA accesses the MHSR to analyze data sets (3430), and the MHSR evaluates data sets and makes a decision to perform a particular action (3440). The IMSA then activates the hardware apparatus to perform an action or function (3450). The environment is impacted by the hardware mechanism (3460), and the sensors detect environmental feedback to the initial hardware action (3470). Finally, when needed, the system presents a feedback loop in which step 3410 (and following) is repeated, until the goal is executed.

Figure 35:
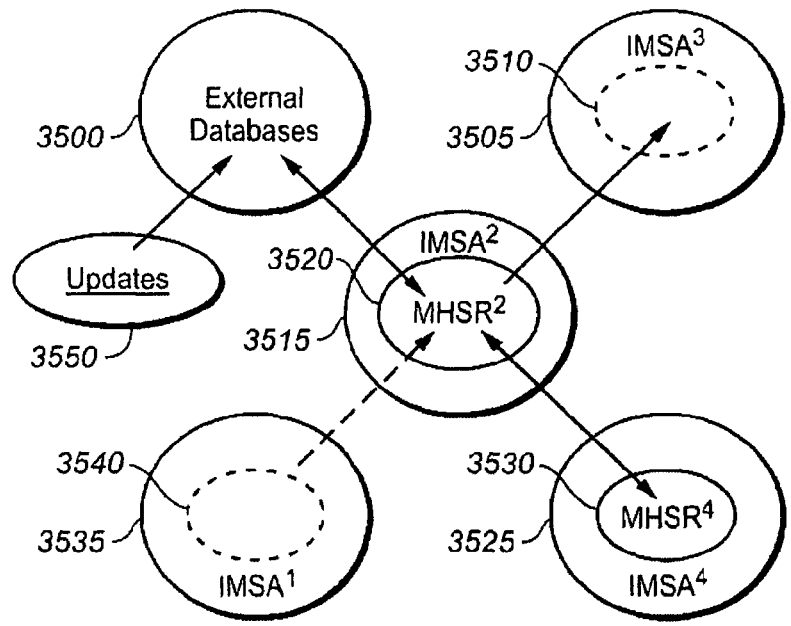
FIG. 35 is a schematic diagram showing the multi-MHSR interaction process in a multi-agent system (MAS).

FIG. 35 shows the multi-MHSR interaction process in a multi-agent system. MHSR 2 (3520), which is seen here embedded in IMSA 2 (3515), is positioned to move to IMSA 3 (3505) at position 3510. MHSR 2 (3520) is seen having moved from IMSA 1 (3535) at position 3540. MHSR 2 interacts with MHSR 4 (3530), which is seen here embedded in IMSA 4 (3525). MHSR 2 also is seen here accessing external databases (3500), which are continually updated (3550). This figure clearly illustrates the dynamic environment of the multi-agent system in which the MHSRs and IMSAs interoperate.

Figure 36:
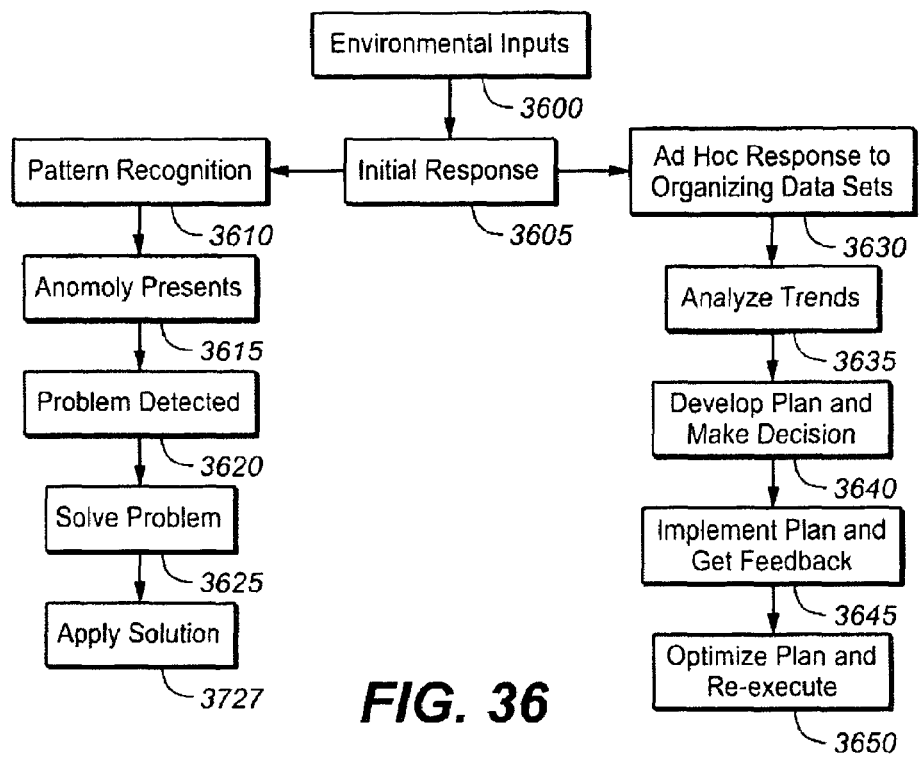
FIG. 36 is a flow chart showing the MHSR simultaneously solving a problem and executing a plan.

FIG. 36 shows the MHSR simultaneously solving a problem and executing a plan. After receiving initial environmental inputs (3600) and generating an initial response (3605), the system is split into two main functions of problem solving, on the one hand, and plan development and execution, on the other. In the case of the former function, pattern recognition is used (3610), an anomaly is presented (3615), a problem is detected (3620) and solved (3625) and a solution applied (3727). In the case of the latter function, an ad hoc response to organizing data sets is made (3630), trends are analyzed (3635), a plan is developed and decisions made (3640), the plan is implemented and feedback generated (3645) and the plan is optimized and re-executed as needed (3650). Its ability to simultaneously process multiple problems and goals makes the MHSR multi-functional and highly useful.

Figure 37:
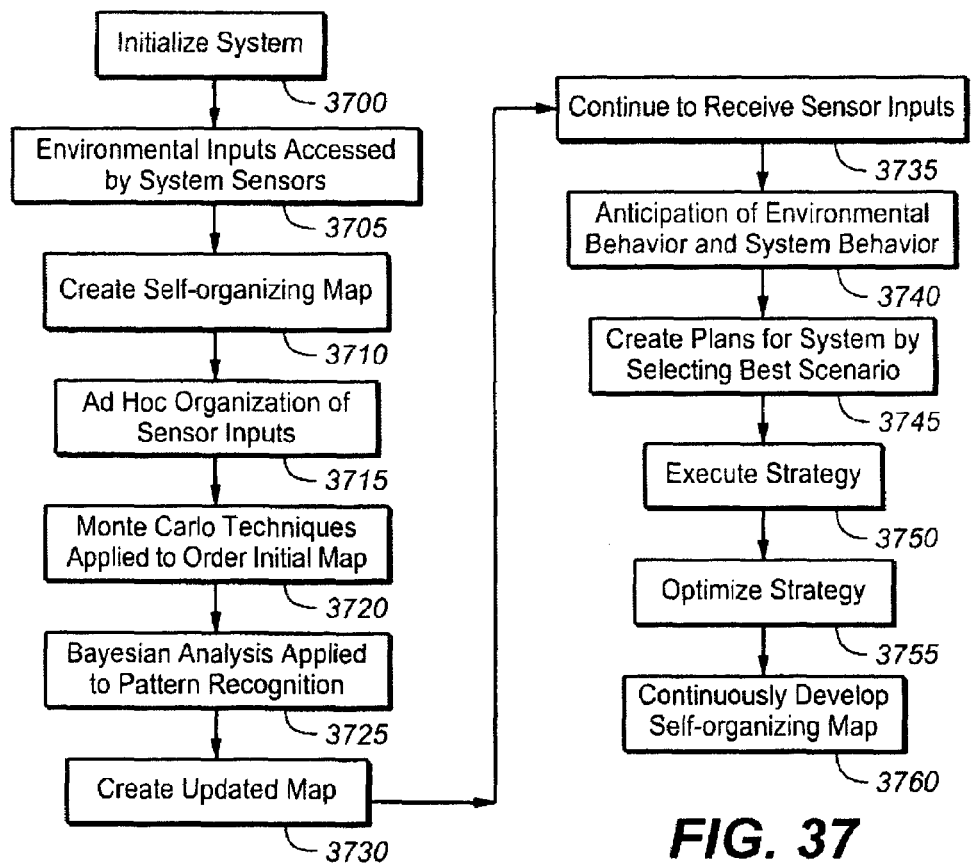
FIG. 37 is a flow chart showing the system organization and regeneration process.

FIG. 37 shows the system organization and regeneration process. After the system is initialized (3700), environmental inputs are accessed by system sensors (3705), and a self-organizing map is created (3710). The organization of sensor inputs occurs ad hoc (3715), and MC techniques are applied to order an initial map (3720). Bayesian analyses are applied to pattern recognition (3725), and an updated map is created (3730). The system continues to receive sensor inputs (3735), and environmental behavior and system behavior is anticipated (3740). Plans are created for the system by selecting the best scenario (3745), and a strategy is executed (3750) and optimized (3755). A feedback loop returns to receive and process sensor inputs. In continuing this process, the system develops a self-organizing map (3760).

Figure 38:
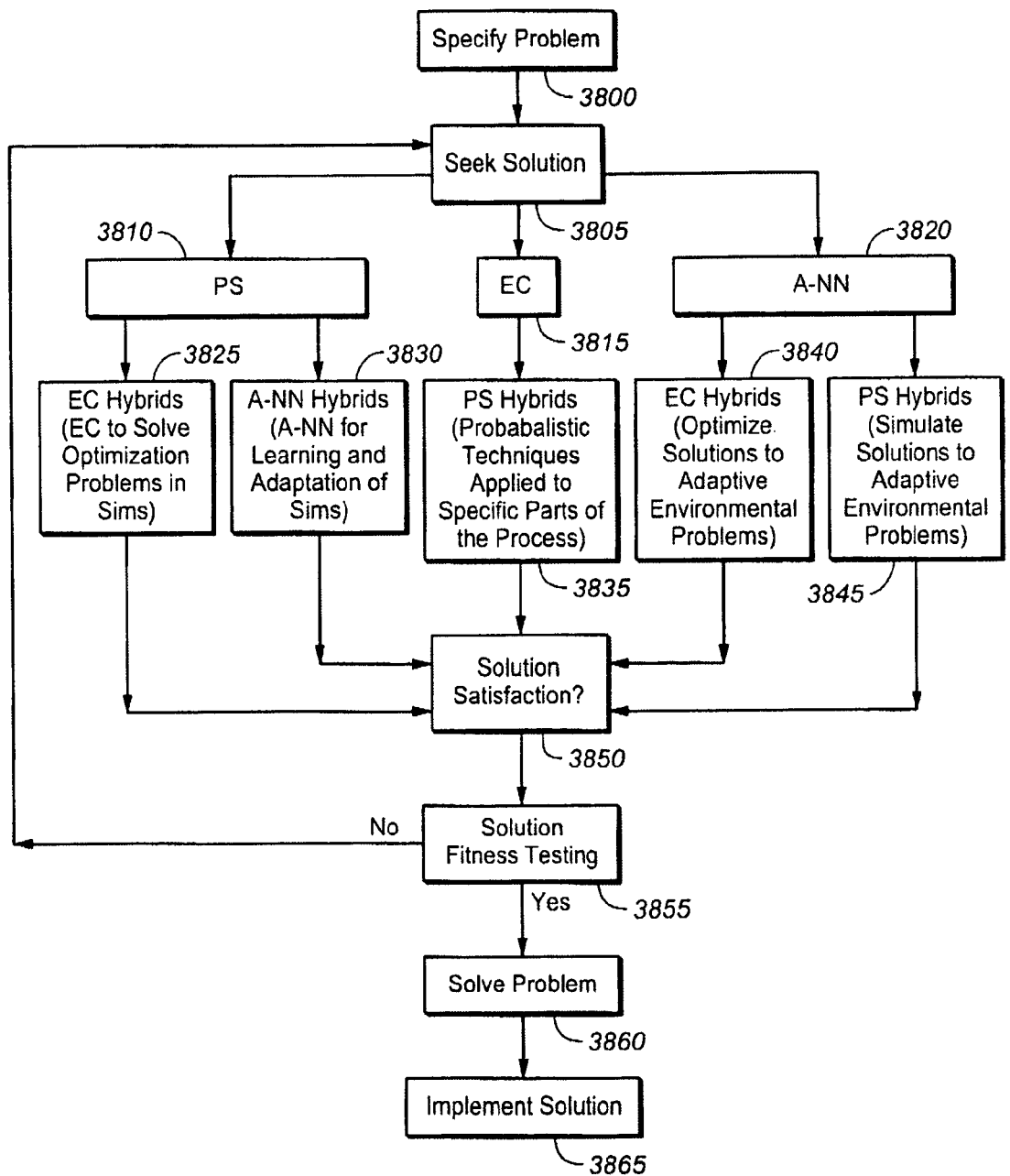
FIG. 38 is a flow chart illustrating hybridization protocols.

FIG. 38 shows the hybridization protocols. After a problem is specified (3800) and a solution sought (3805), several main computational or mathematical techniques of PS (3810), EC (3815) and A-NN (3820) are accessed to solve the problem. PS is hybridized with EC techniques to solve optimization problems in simulations (3825) and with A-NN techniques for learning and adaptation of simulations (3830). EC is hybridized with PS techniques for application to specific parts of the EC process (3835). A-NN is hybridized with EC techniques for optimal solutions to adaptive environmental problems (3840) and with PS for solutions to adaptive environmental problems (3845). Respective solution fitness is assessed (3850) and tested (3855). If the solution is not fit, the feedback is re-presented back to 3805. If the solution is fit, the problem is solved (3860), and the solution is implemented (3865).

Figure 39:
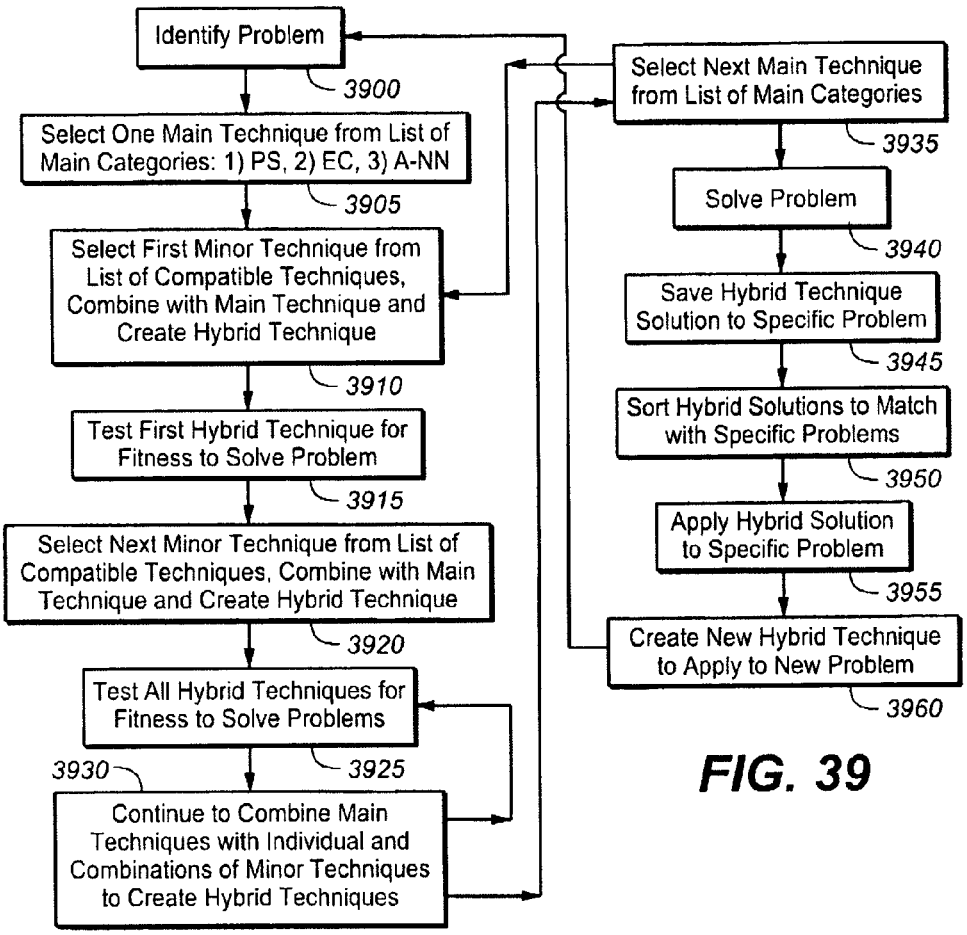
FIG. 39 is a flow chart illustrating the sorting order for testing hybridization fitness.

FIG. 39 shows the sorting order of testing for hybridization fitness. After a problem is identified (3900), one main technique is selected from among the list of categories of PS, EC, A-NN, or other techniques (3905). The first minor technique is selected from a list of compatible techniques, and, once combined with the main technique, a hybrid technique is created (3910). The first hybrid technique to solve a problem is tested for fitness (3915). The next minor technique from a list of compatible techniques is combined with the main technique, and a hybrid technique is created (3920). All hybrid techniques are tested for fitness to solve problems (3925). Bayesian learning techniques are applied to further testing of the hybrid techniques to sort, and save, the most useful approaches.

The system continues to combine main techniques with individual, and combinations of, minor techniques to create hybrid techniques (3930), and a feedback loop continues to test all hybrid techniques for fitness to solve problems (3925). The next main technique is selected from a list of main categories (3935), and problems are solved (3940). A feedback loop continues to seek out hybrid techniques (3910) until the problem is solved. Successful hybrid technique solutions to specific problems are saved (3945), matched and sorted (3950). The hybrid solution to a specific problem is applied (3955), and new hybrid techniques are created to apply to new problems (3960). The process then renews.

Figure 40:
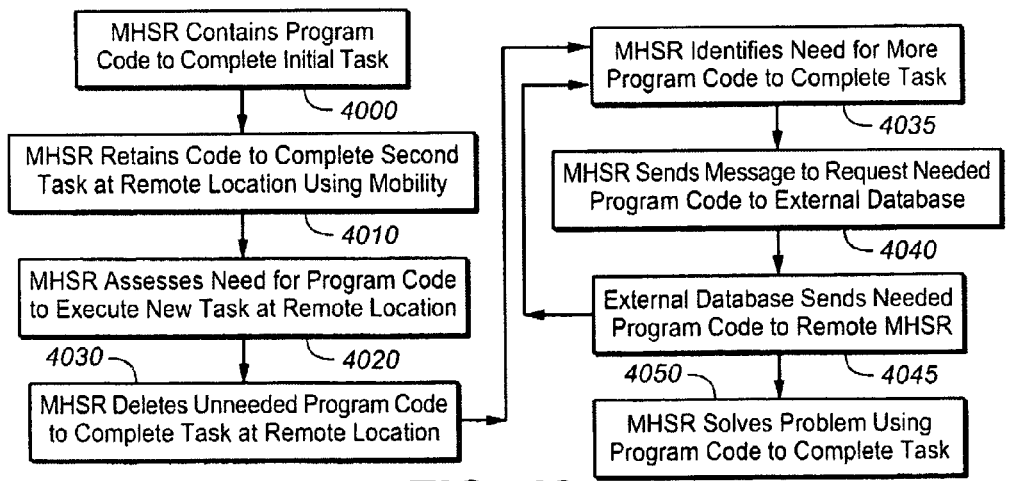
FIG. 40 is a flow chart showing the plasticity of updated program code by the MHSR to execute a mobile task.

FIG. 40 shows the plasticity of updated program code used by the MHSR to execute a mobile task. The MHSR contains program code to complete an initial task (4000) and retains code to complete a second task at remote location, using mobility (4010). The MHSR assesses the need for program code to execute a new task at a remote location (4020) and deletes unneeded program code to efficiently complete the task at a remote location (4030). The MHSR then identifies the need for more program code to complete a task (4035) and sends a message to request needed program code to an external database (4040) or multiple databases in a distributed network. In some cases, other MHSRs may supply data from their database, as a form of cooperation. The external database(s) send(s) needed program code to the remote MHSR (4045). A feedback loop returns to the MHSR, identifying the need for more program code to complete a task (4035). The MHSR finally solves the problem, using program code to complete the task (4050).

One of the advantages of the MHSR is that it may not need to carry massive amounts of program code as it moves from machine to machine to perform its tasks. The way that it can process these functions is to efficiently use the code it needs in a particular task. To do this, specific program code is discontinued or deactivated if unused, while additional program code is requested if required. Modular bits of parts of computer programs break up, combine and recombine in order to solve problems in real time and in multiple locations. By continuously dropping and adding fragments of code, and by constantly recombining specific hybrid techniques, automated programming functions are facilitated in an intelligent system.

Sequences of hybrid techniques are combined in order to effectuate particular tasks in complex systems. These systems are optimized by continuously sorting the priority of specific functional tasks that use sequences of hybrid techniques.

Complex System Applications

FIGS. 41 to 45 delineate the complex system operations of (a) a dynamic enterprise management system, (b) communications networking system, (c) commercial systems, (d) bio systems and (e) collective robotics systems. As computation and communications resources become ubiquitous, these complex systems will become increasingly essential. MHSRs are intended to operate in these complex dynamic systems.

Enterprise management systems are used by corporations to organize their global resources. In an analogy to a human body, the various sub-systems of the enterprise are unified into a synchronized system. The individual enterprise interacts with various businesses and must develop forecasting and planning models to efficiently organize production and consumption. This application embodies micro-economic behavior.

Communication networks demonstrate system plasticity, that is, constant rerouting optimization, by using the present invention. Intelligent systems constantly anticipate catastrophes and automatically reroute activity. The present invention is also applicable to transformative spatio-temporal object relational (T-STOR) databases which are structured to rapidly process massive amounts of data for optimum operation.

Complex disintermediated trading systems may use the present invention as well. These composite economic systems emulate transformative trading hubs. In addition, these economic architectures characterize supply chain management systems. This application embodies macro-economic behavior.

Complex biosystems may use the present invention with several distinct applications. Bioinformatics embraces several categories, including structural proteomics and functional proteomics, to which the present invention may be applied. In addition, personalized medicine systems, which identify combinations of genetic mutations and compare them to protein databases in order to develop individualized therapies, would use the present invention for optimization.

Collective robotics (CR) systems may also use the present inventions with several distinct applications. CR categories include traffic coordination, hazard management, sensor control, factory system management and weapon system control and optimization, which are all optimized with the present invention.

These applications are illustrated to use specific hybrid techniques for particular tasks falling within the main categories of learning, problem solving, optimization and simulation. Hybrid techniques are implemented using other aspects of the present invention, disclosed herein.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

List of Acronyms:
MHSR: Mobile Hybrid Software Router
IMSA: Intelligent Mobile Software Agent
MAS: Multi-Agent System
MC: Monte Carlo
CA: Cellular Automata
EC: Evolutionary Computation
GA: Genetic Algorithm
GP: Genetic Programming
EP: Evolutionary Programming
A-NN: Artificial Neural Network
E-A-NN: Evolutionary Artificial Neural Network
CR: Collective Robotics
SVM: Support Vector Machine
PS: Probabilistic Simulations
FPGA: Field Programmable Gate Array
CP-FPGA: Continuously Programmable Field Programmable Gate Array
EHW: Evolvable Hardware
AI: Artificial Intelligence
DAI: Distributed Artificial Intelligence
ASIC: Application Specific Integrated Circuit

What is claimed is:

1. A computer program product to organize a mobile hybrid software router (MHSR) by combining computational or mathematical techniques into hybrid techniques or sequences of hybrid techniques, such techniques stored on a computer readable storage medium, executable by an electronic circuit with the following system architecture having a plurality of system layers interconnected to one another, comprising:

a first layer including a hybrid technique typology;
a second layer including a typology of combinations of hybrid techniques for specific applications;
a third layer including a router implementation of hybrid technique combinations;
a fourth layer including intelligent mobile software agent (TMSA) implementations of the router;
a fifth layer including group behaviors of multiple routers;
a sixth layer including auto-programming of a network of IMSAs and routers;
a seventh layer including implementation to a field programmable gate array (FPGA);
an eight layer including a system of multiple FPGAs; and
a ninth layer including collective behavior of self-organizing networks;
wherein the MHSR accepts data representing a computer network.

2. The computer program product as claimed in claim 1 in which the MHSR executes instructions to perform:
- an evolutionary computation (EC) technique;
- a probabilistic simulations (PS) technique;
- an artificial neural networks (A-NN) technique; or
- a machine learning (ML) technique.

3. A computer program product as claimed in claim 1, in which implementation of the MHSR is performed in an intelligent mobile software agent (IMSA) in a multi-agent system (MAS) to:
- solve computational or engineering problems;
- complete computational or engineering tasks; or
- optimize complex applications.

4. A computer program product as claimed in claim 1, in which mobility is functionally performed by MHSRs or IMSAs by sending program code between computers in a network.

5. A computer program product as claimed in claim 1, in which a database, or combination of distributed databases, is accessed by a MHSR or IMSA.

6. A computer program product as claimed by claim, 1, in which implementation is made to a continuously programmable field programmable gate array (CP-FPGA) to facilitate adaptation to a changing environment; and in which multi-CP-FPGA interoperation processes are implemented and coordinated to perform self-organization.

7. A computer program product as claimed in claim 1, in which multi-IMSA interoperation processes are implemented and coordinated to perform self-organization in an intelligent system.

8. A computer program product as claimed in claim 1, in which the MHSR is applied to an enterprise resource management system.

9. A computer program product as claimed in claim 1, in which the MHSR is applied to routing plasticity in communications networks in dynamic environments.

10. A computer program product as claimed in claim 1, in which the MHSR is applied to commercial trading networks for supply chain management solutions concerning resource allocation.

11. A computer program product as claimed in claim 1, in which the MHSR is applied to bio systems, including structural proteomics, functional proteomics and personalized medicine solutions modeling.

12. A computer program product as claimed in claim 1, in which the MHSR is applied to collective robotics.

* * * * *